United States Patent
Shafai et al.

(10) Patent No.: US 8,762,760 B2
(45) Date of Patent: Jun. 24, 2014

(54) METHOD AND APPARATUS FOR ADAPTIVE POWER CONTROL IN A MULTI-LANE COMMUNICATION CHANNEL

(75) Inventors: Farhad Shafai, Kanata (CA); Fredrik Olsson, Los Altos, CA (US); Mark Andrew Gustlin, Campbell, CA (US)

(73) Assignees: Xilinx, Inc., San Jose, CA (US); Cisco Systems, Sunnyvale, CA (US); Cortina Systems, Inc., Sunnyvale, CA (US)

( * ) Notice: Subject to any disclaimer, the term of this patent is extended or adjusted under 35 U.S.C. 154(b) by 811 days.

(21) Appl. No.: 12/881,342

(22) Filed: Sep. 14, 2010

(65) Prior Publication Data

US 2012/0066531 A1    Mar. 15, 2012

(51) Int. Cl.
 *G06F 1/00*    (2006.01)

(52) U.S. Cl.
 USPC ............. 713/324; 713/300; 713/320; 710/57; 710/71

(58) Field of Classification Search
 USPC ........................ 713/300, 320, 324; 710/57, 71
 See application file for complete search history.

(56) References Cited

U.S. PATENT DOCUMENTS

| | | | |
|---|---|---|---|
| 5,404,544 A | 4/1995 | Crayford | |
| 5,461,266 A | 10/1995 | Koreeda et al. | |
| 5,528,593 A | 6/1996 | English et al. | |
| 5,907,553 A | 5/1999 | Kelly | |
| 5,996,081 A | 11/1999 | Shim | |
| 6,442,174 B1 | 8/2002 | Lin | |
| 6,791,942 B2 | 9/2004 | Jin | |
| 6,993,667 B1 | 1/2006 | Lo | |
| 7,137,018 B2 | 11/2006 | Gutman et al. | |
| 7,188,263 B1 | 3/2007 | Rubinstein et al. | |
| 7,197,591 B2 | 3/2007 | Kwa et al. | |
| 7,370,132 B1 | 5/2008 | Huang et al. | |
| 7,426,598 B2 * | 9/2008 | Kwa et al. | 710/307 |
| 7,447,824 B2 * | 11/2008 | Jabori et al. | 710/307 |
| 7,454,222 B2 * | 11/2008 | Huang et al. | 455/522 |
| 7,469,311 B1 * | 12/2008 | Tsu et al. | 710/307 |
| 7,477,662 B2 | 1/2009 | Lim et al. | |
| 7,480,808 B2 * | 1/2009 | Caruk et al. | 713/300 |

(Continued)

OTHER PUBLICATIONS

Interlaken Protocol Definition, Revision 1.2; Oct. 7, 2008, A joint Specification of Cortina Systems and Cisco Systems.

*Primary Examiner* — Jaweed A Abbaszadeh
(74) *Attorney, Agent, or Firm* — Laurence E. Laubsher, Jr.; LeRoy D. Maunu

(57) ABSTRACT

An apparatus consisting of a digital communication channel comprised of a multiplicity of lanes where data is striped across the lanes in a predefined sequence. Each lane has the ability to be powered down or powered up in response to the amount of data being held in a transmit buffer at one end of the communication channel. The method consists of monitoring the amount of data being held in the transmit buffer; making the decision of how many lanes are required based on the amount of data; sending signals to cause the required number of lanes to be powered down or powered up; and performing the required power down or power up action at the particular transmitter and receiver. The fill level of the transmit buffer is continually monitored and the required number of active lanes and the striping sequence is calculated and updated as required as a function of the fill level, where a larger amount of data waiting to be transmitted will result in a greater number of lanes being powered up and a smaller amount of data waiting to be transmitted will result in a lesser number of lanes being powered up.

32 Claims, 19 Drawing Sheets

Overview of Method and Apparatus

(56) References Cited

U.S. PATENT DOCUMENTS

| | | |
|---|---|---|
| 7,574,619 B2 | 8/2009 | Senda |
| 7,657,672 B2 * | 2/2010 | Kampmann et al. ............. 710/52 |
| 7,788,439 B1 * | 8/2010 | Tsu et al. ....................... 710/307 |
| 7,793,030 B2 * | 9/2010 | Jenkins et al. ................. 710/307 |
| 8,069,355 B2 * | 11/2011 | Simeral et al. ................. 713/300 |
| 8,135,972 B2 * | 3/2012 | Olsson et al. .................. 713/324 |
| 8,205,028 B1 * | 6/2012 | Sakarda ......................... 710/307 |
| 8,208,467 B2 * | 6/2012 | Kapil et al. .................... 370/392 |
| 8,504,859 B2 * | 8/2013 | Olsson et al. .................. 713/324 |
| 2002/0083241 A1 * | 6/2002 | Moller ........................... 710/100 |
| 2005/0144488 A1 * | 6/2005 | Lee et al. ....................... 713/300 |
| 2006/0015761 A1 * | 1/2006 | Kwa et al. ...................... 713/320 |
| 2006/0034295 A1 * | 2/2006 | Cherukuri et al. ........ 370/395.52 |
| 2006/0285553 A1 * | 12/2006 | Kwa et al. ...................... 370/468 |
| 2007/0094437 A1 | 4/2007 | Jabori et al. |
| 2007/0226596 A1 | 9/2007 | Safranek et al. |
| 2009/0100278 A1 * | 4/2009 | Caruk et al. ................... 713/300 |
| 2011/0202781 A1 * | 8/2011 | Wang et al. .................... 713/323 |
| 2012/0137157 A1 * | 5/2012 | Olsson et al. .................. 713/324 |

\* cited by examiner

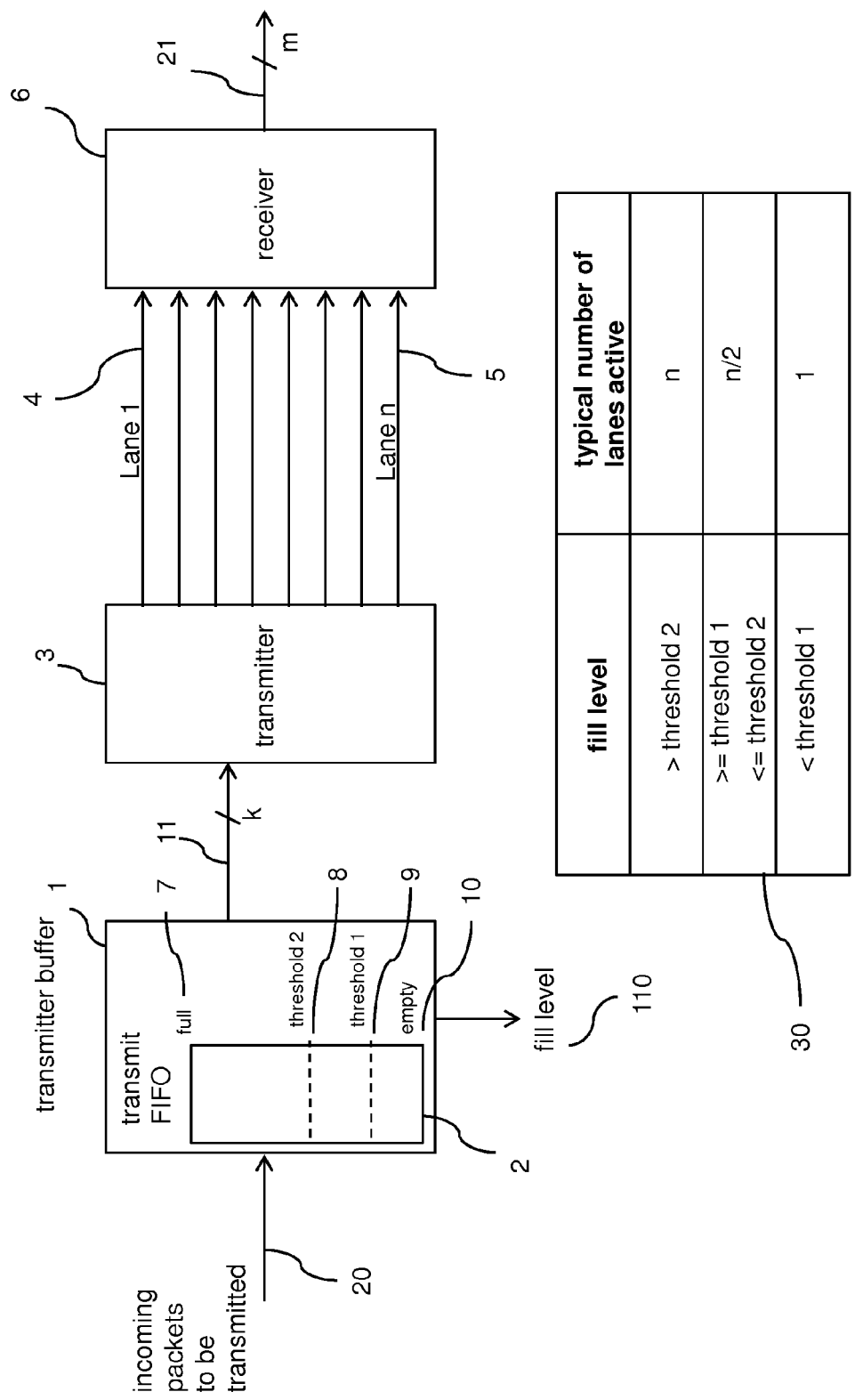
Fig 1. Overview of Method and Apparatus

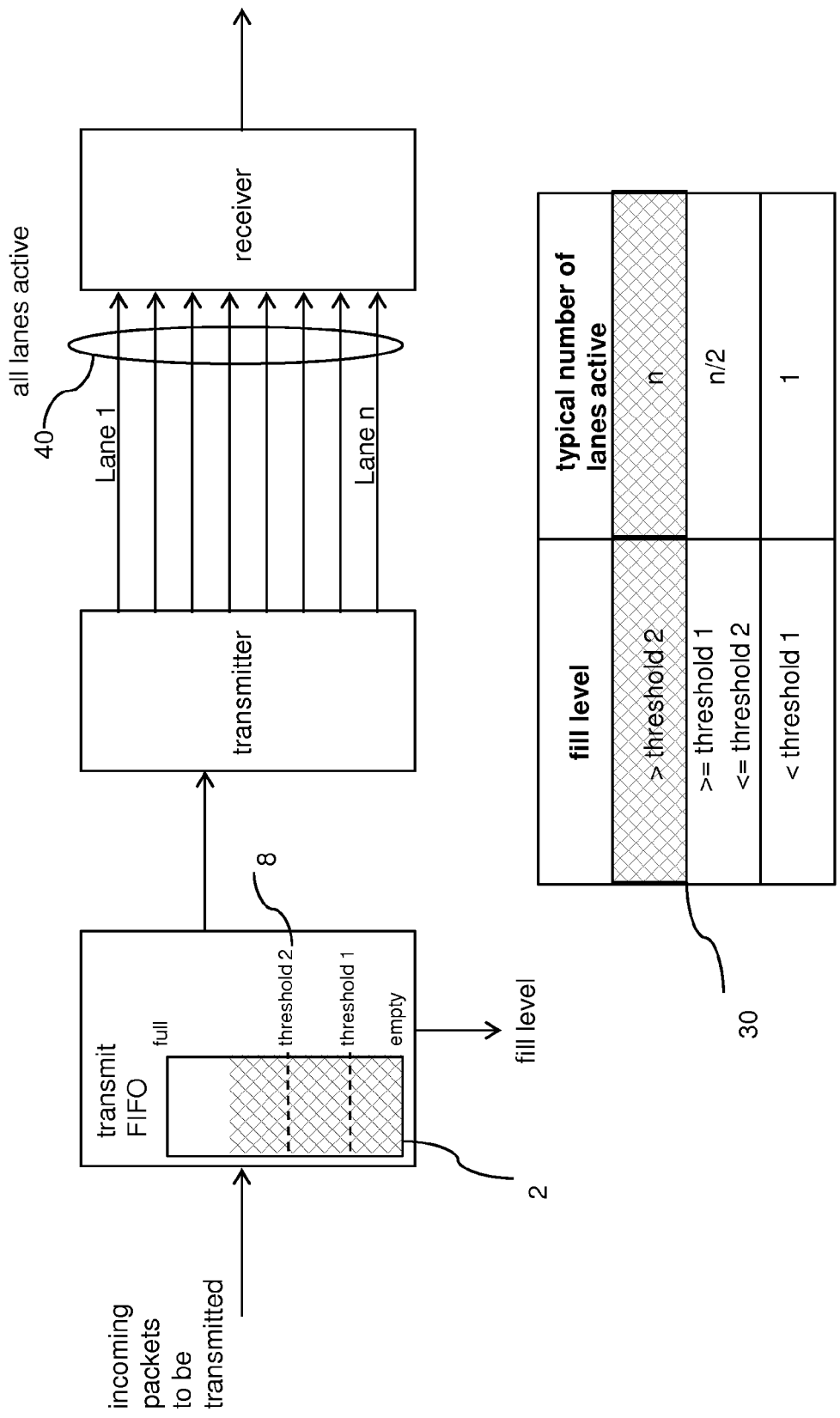

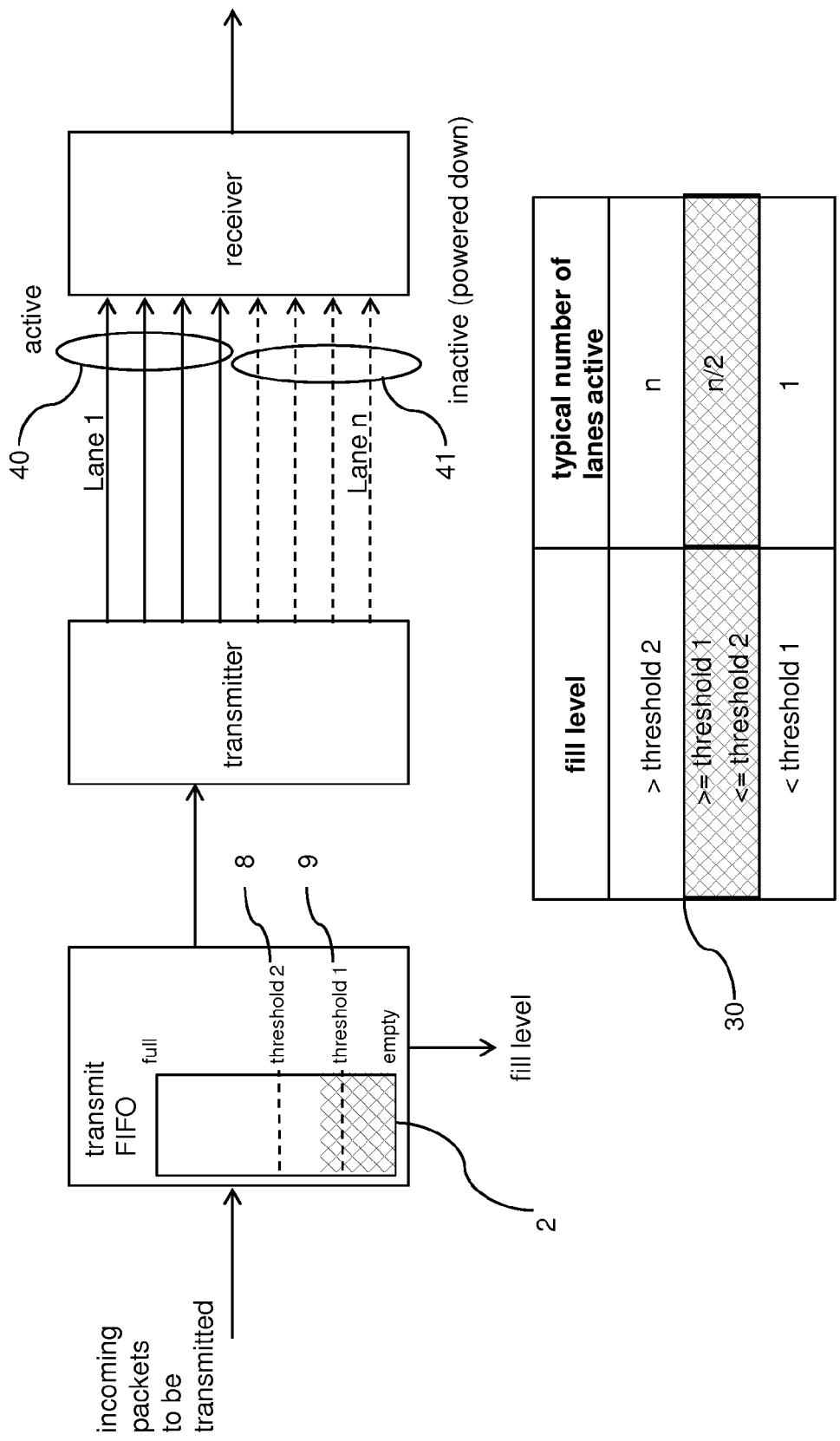

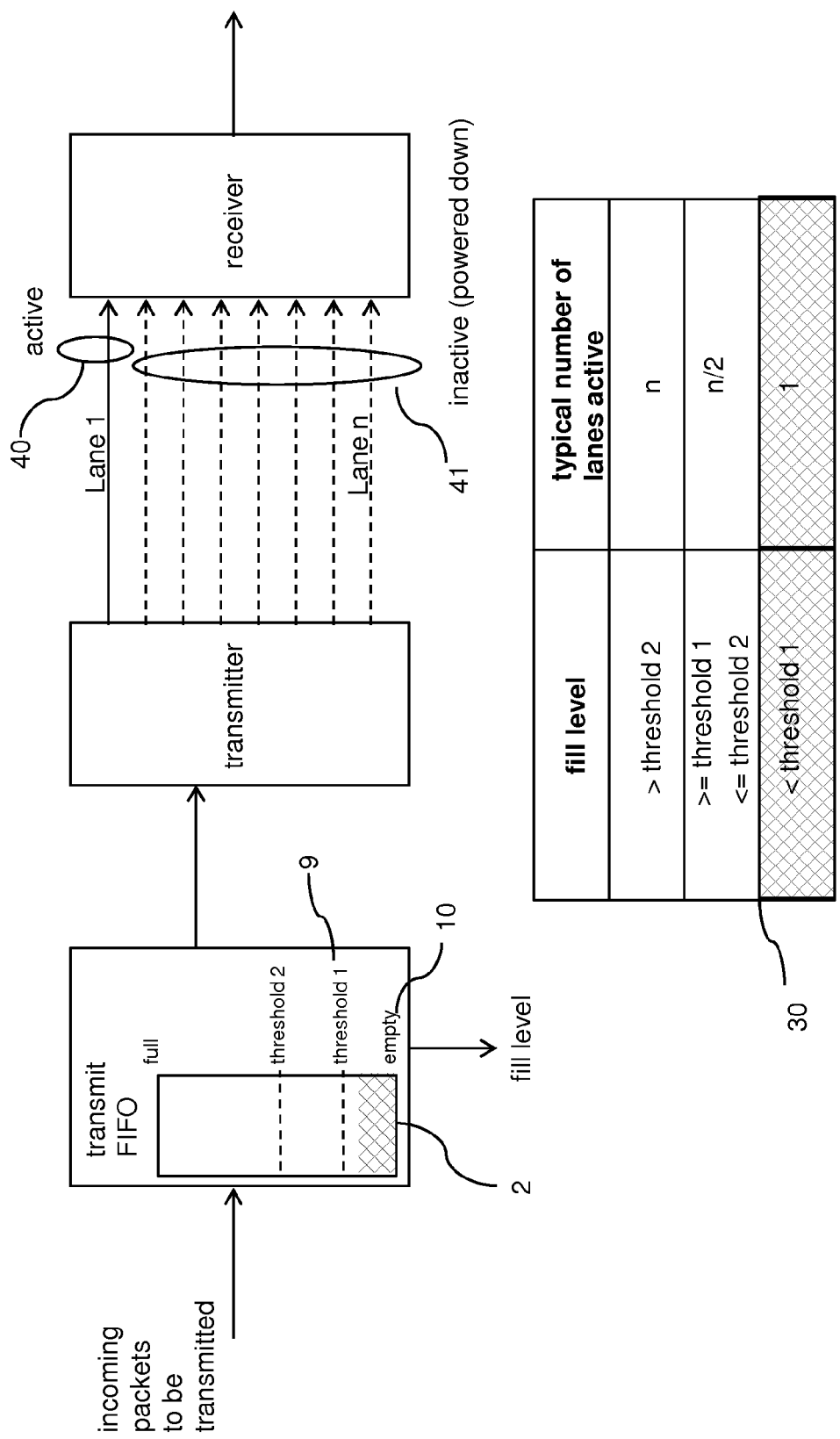
Fig 4. Active Lanes When Fill Level < Threshold 1

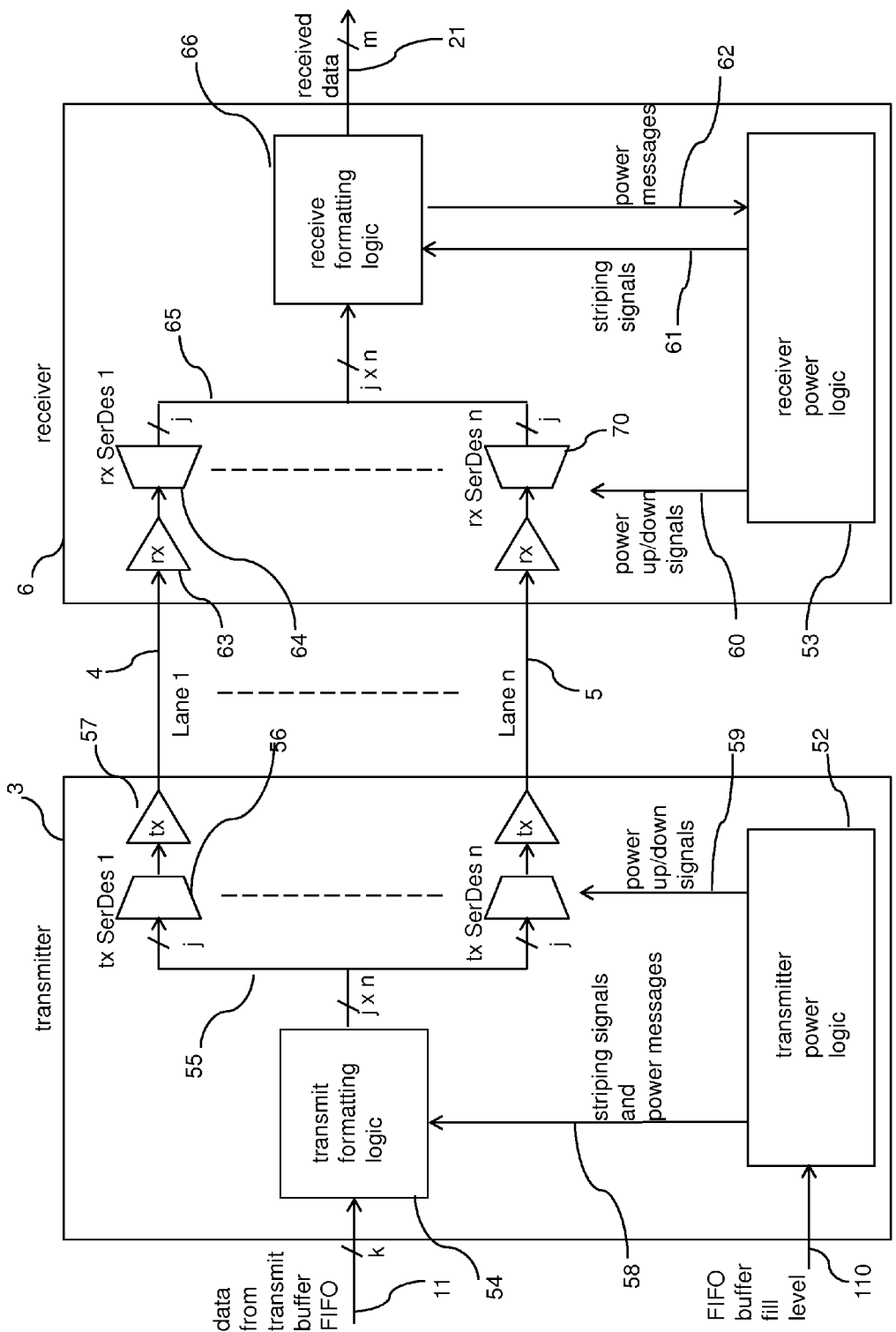
Fig. 5 Transmitter and Receiver Details

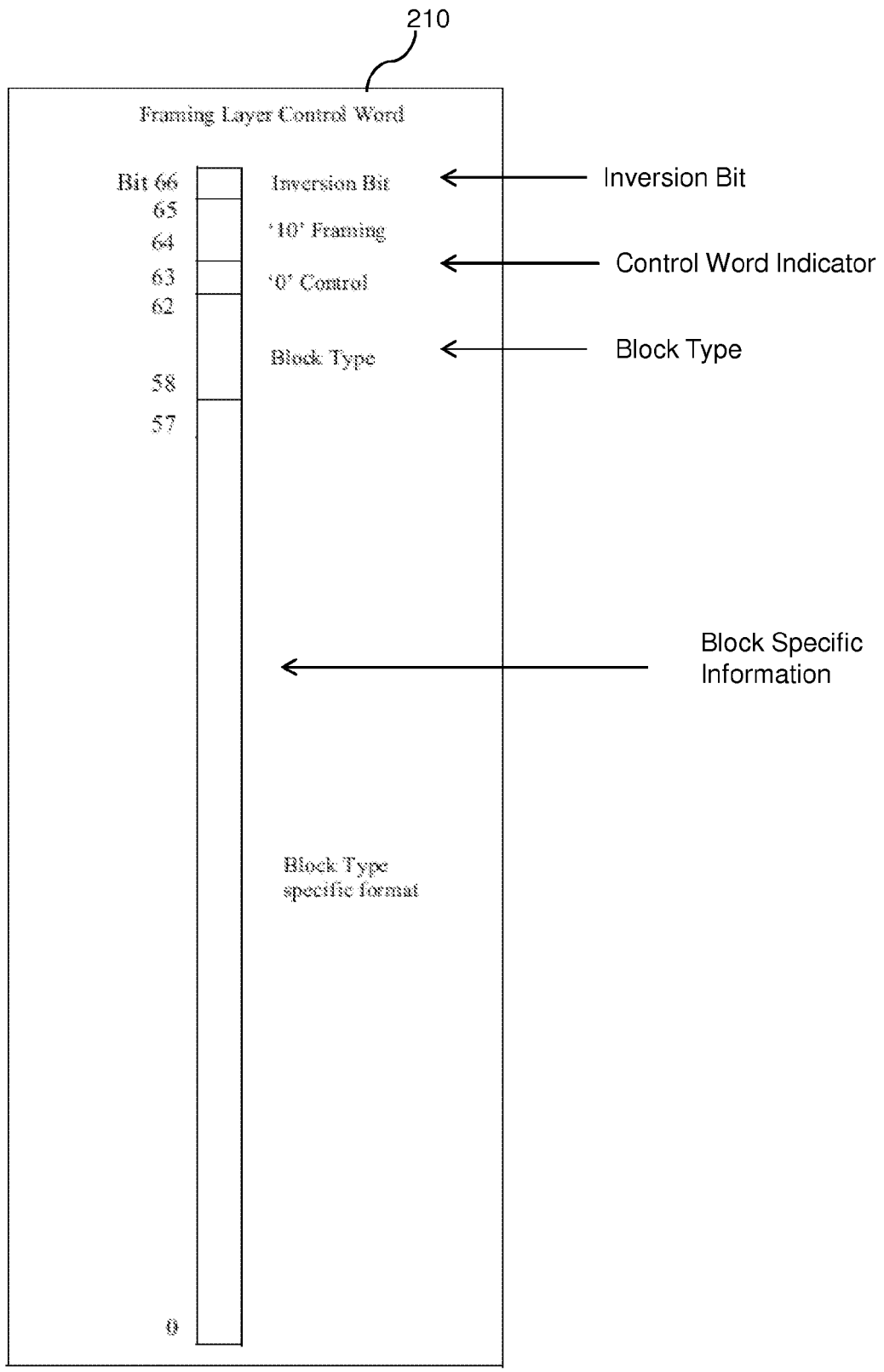
Fig 6. Control Word Format

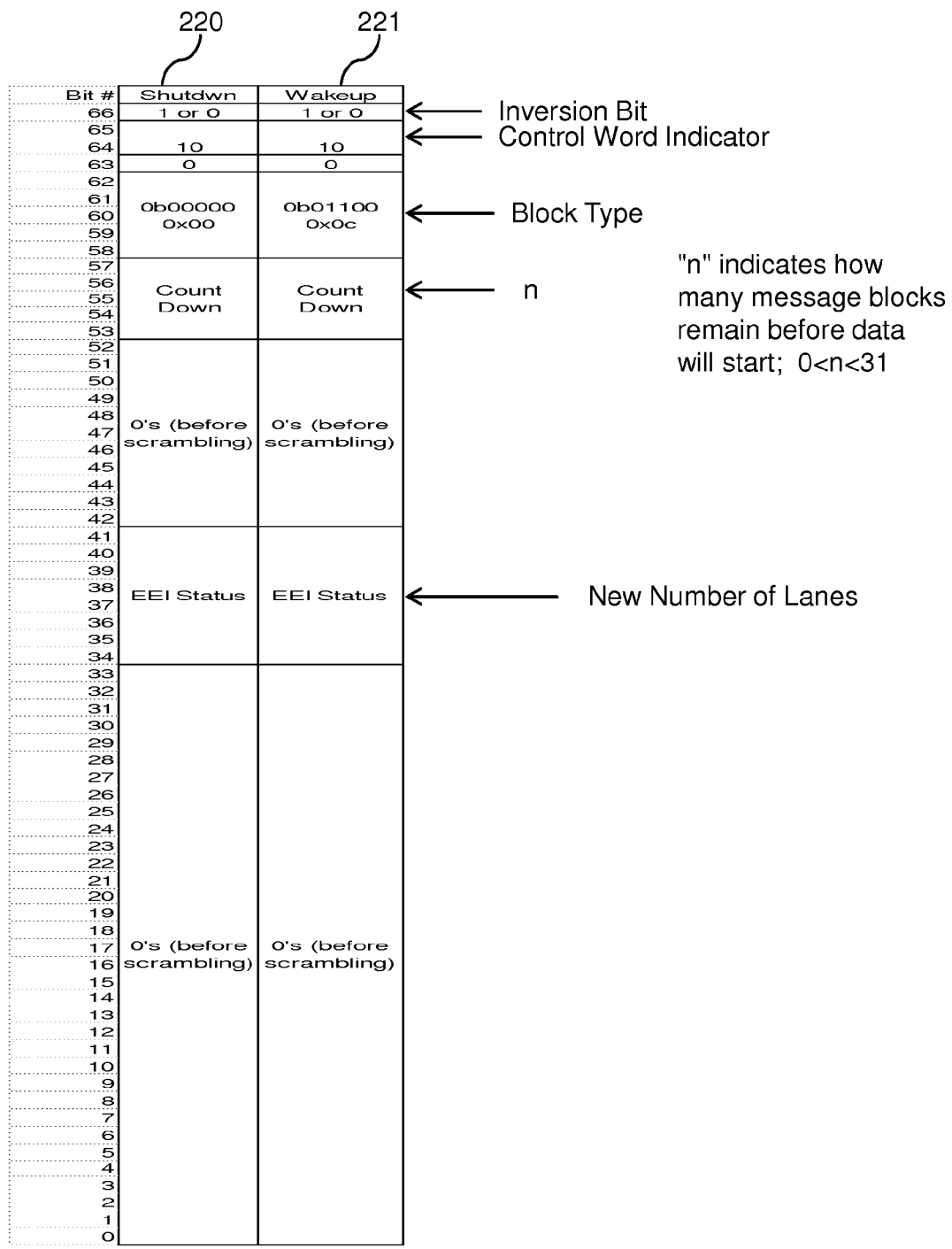
Fig 7. Shutdown and Wakeup Messages
Bit values shown are before scrambling.

Fig 8. Fast Sync Message
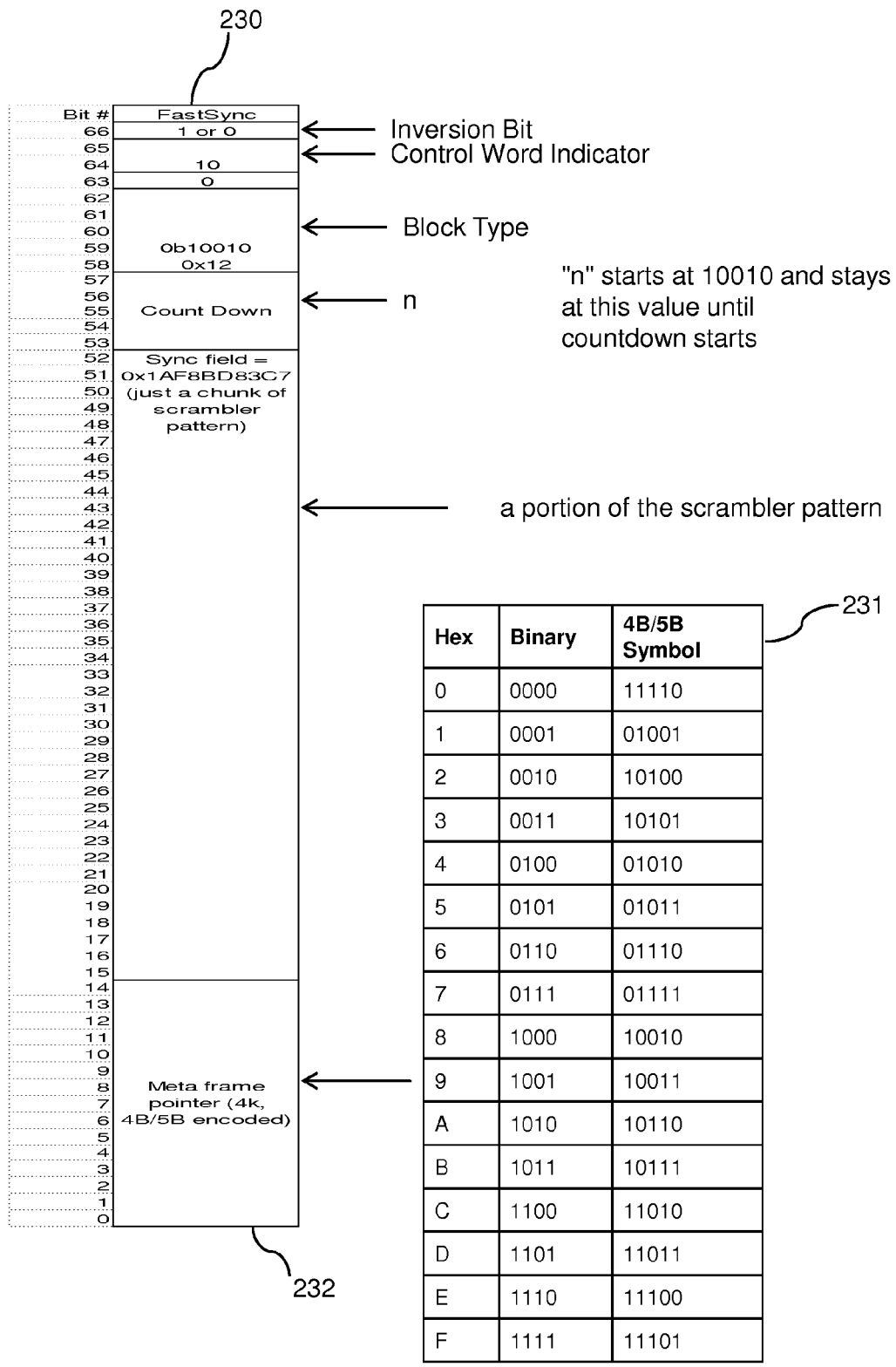

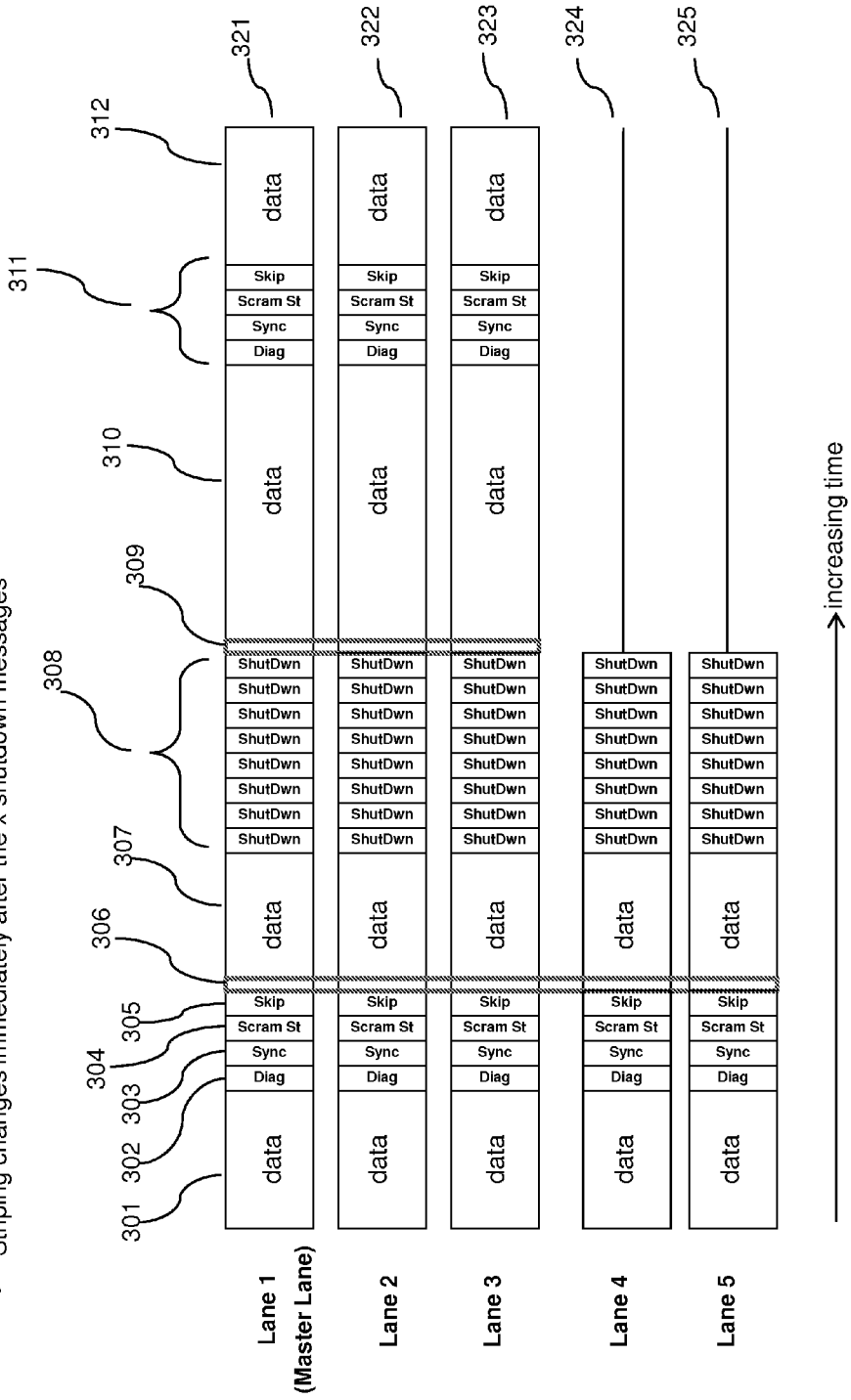

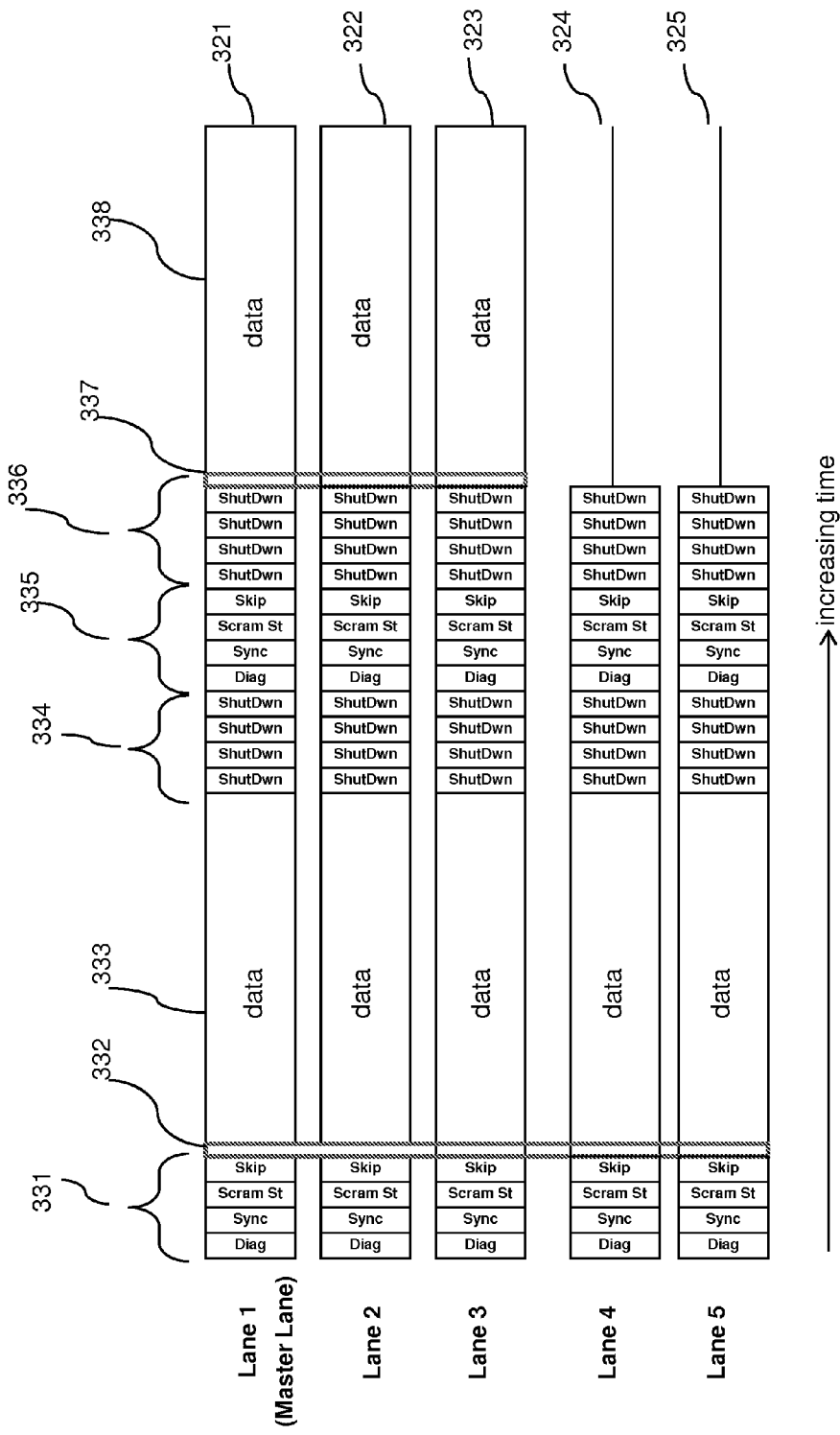
Fig. 10 Shutdown Signaling With Meta Frame Collision
- If any of the n shutdown messages will interfere with the meta frame, then you pause the shutdown messages to transmit the meta frame

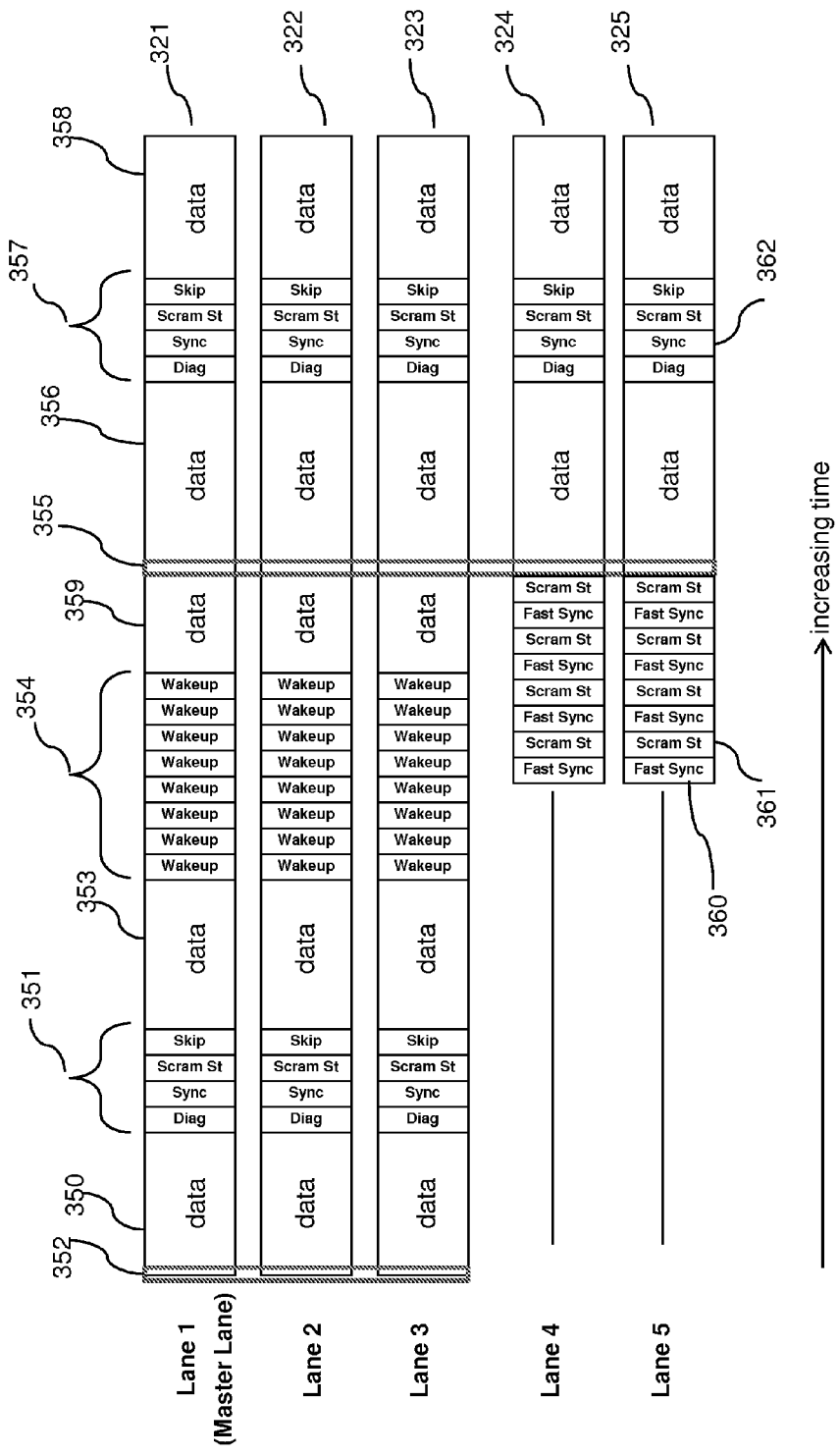

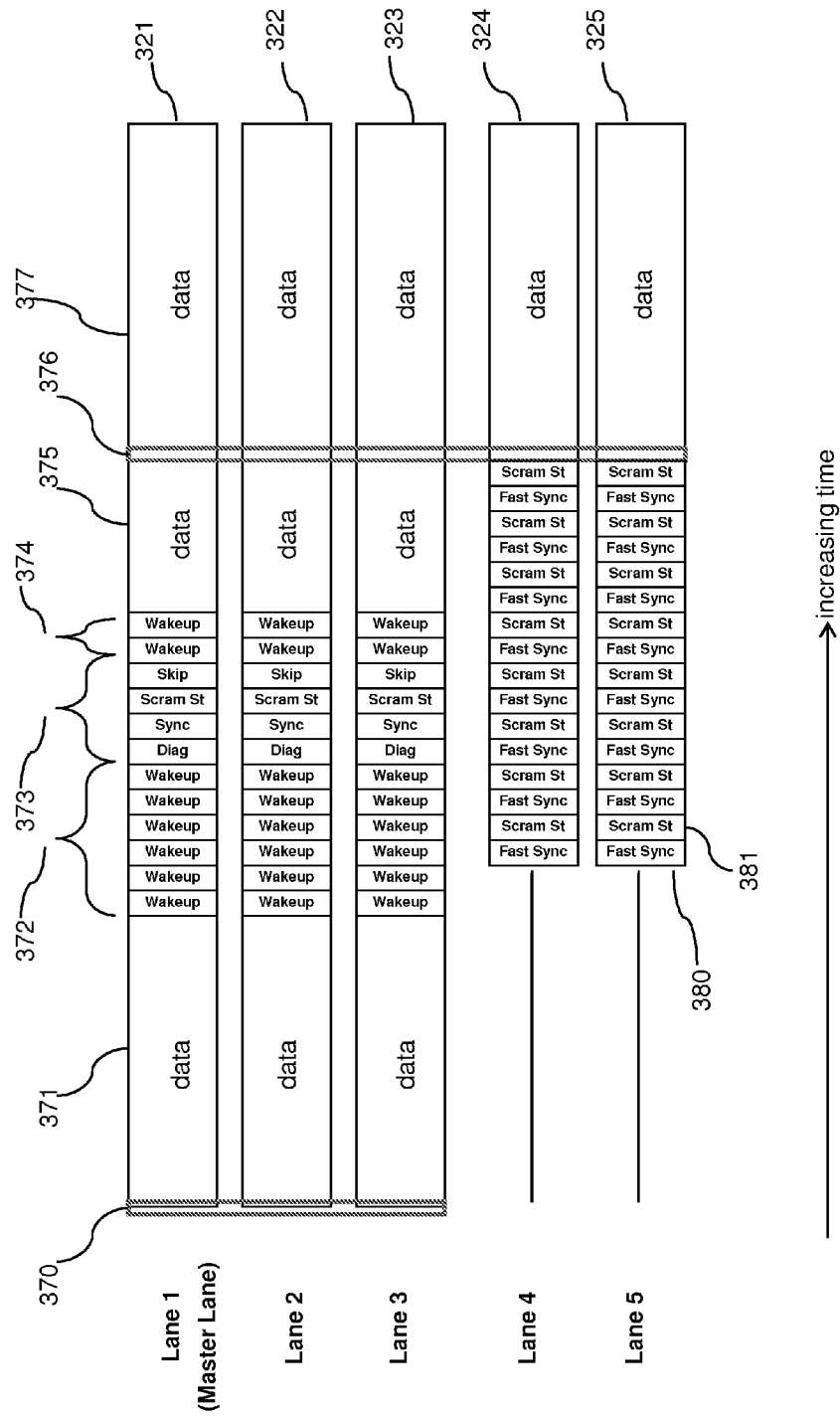

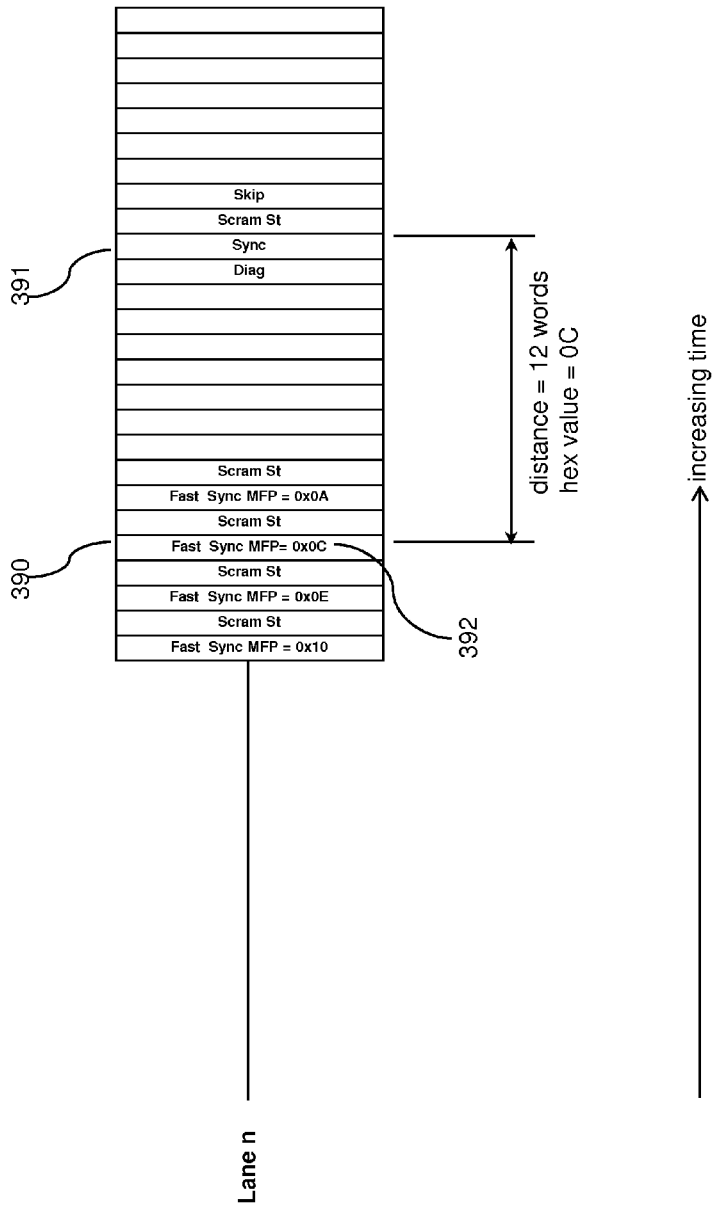
Fig. 13 Fast Sync Offset Calculation
- The Fast sync word points to the next alignment word of the next metaframe
- Below provides an example of valid meta frame pointer values

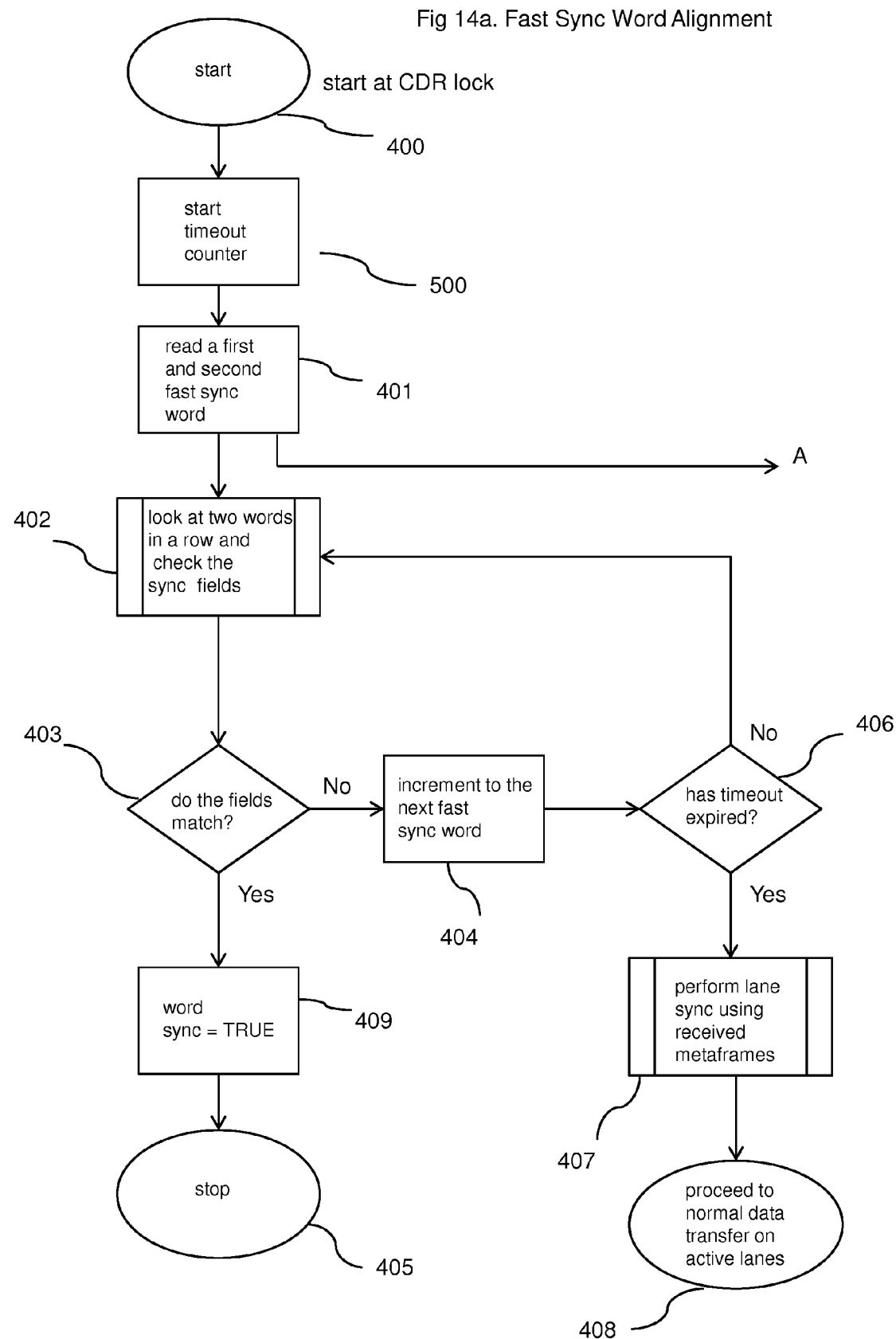

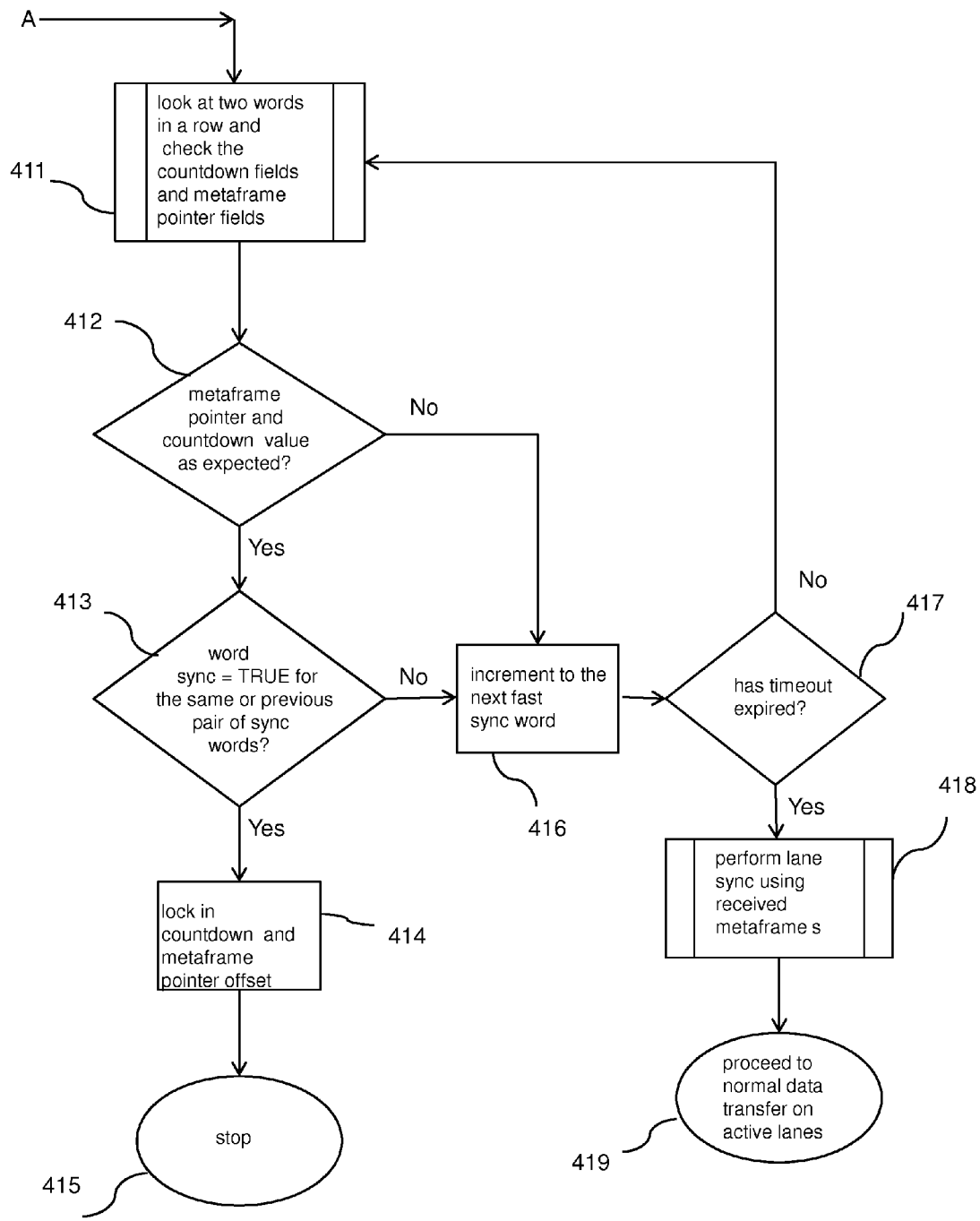
Fig 14b. Fast Sync Word Alignment continued

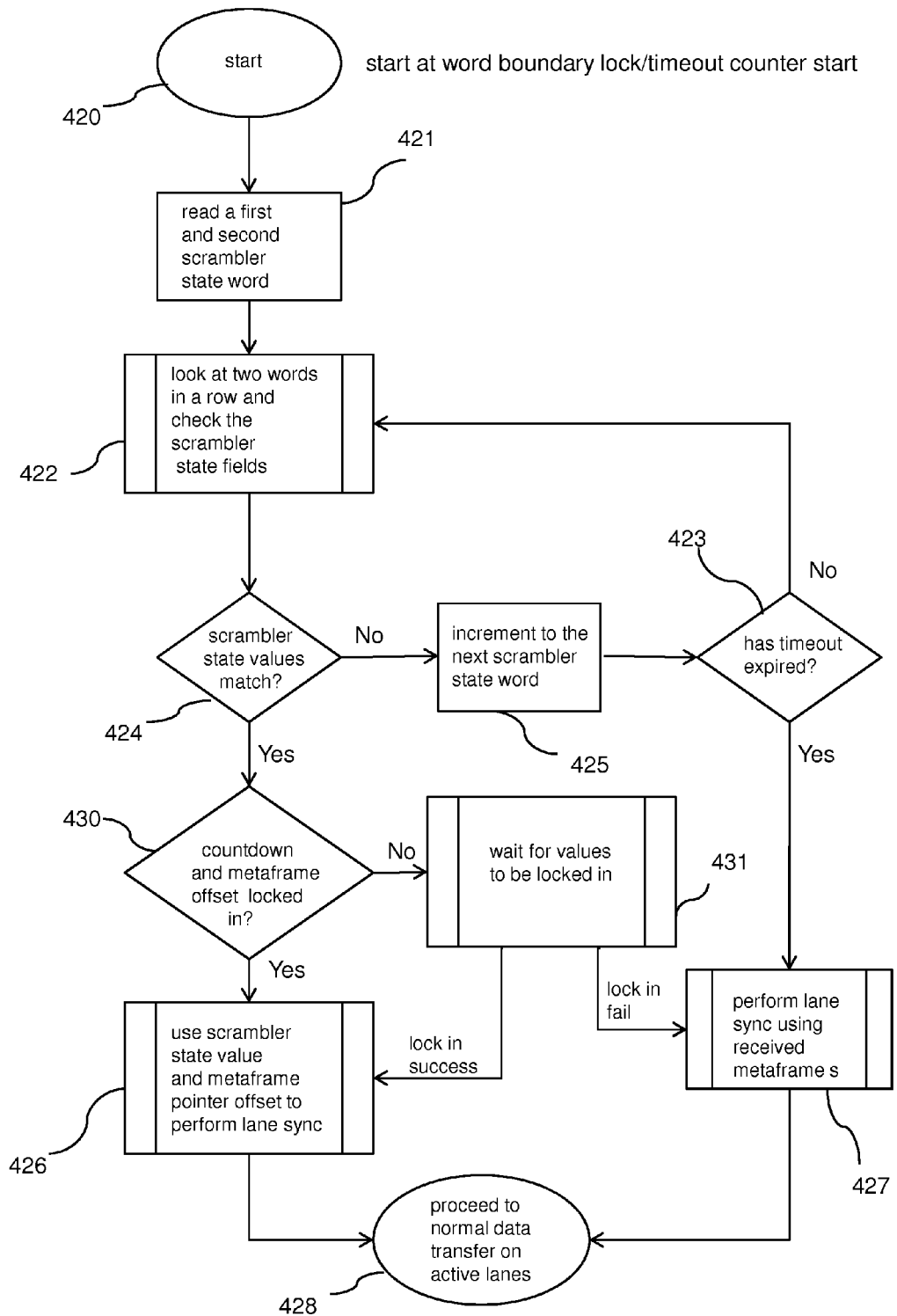
Fig 15 Scrambler State Processing and Lane Alignment

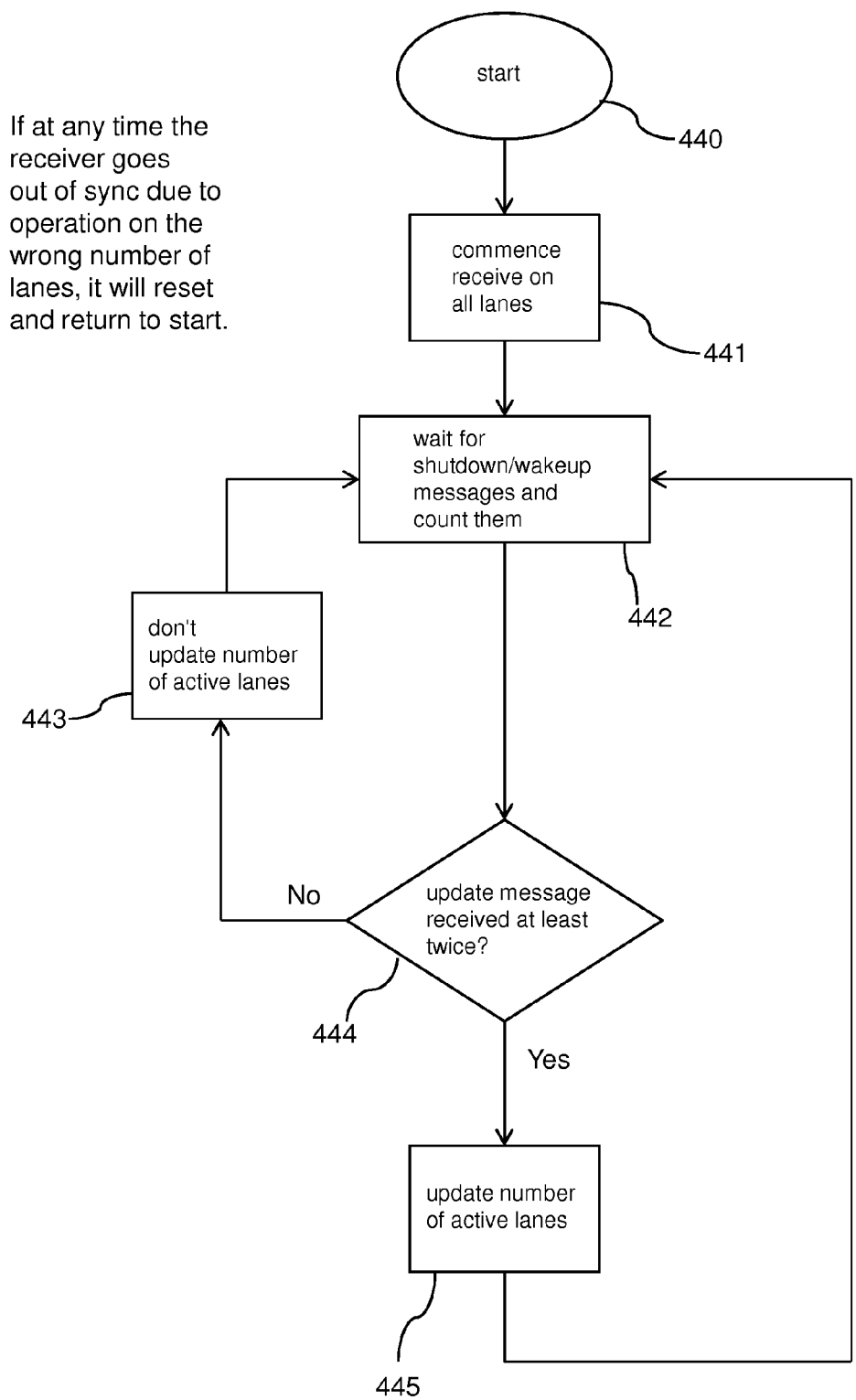
Fig 16. Receiver Active Lane Update Algorithm

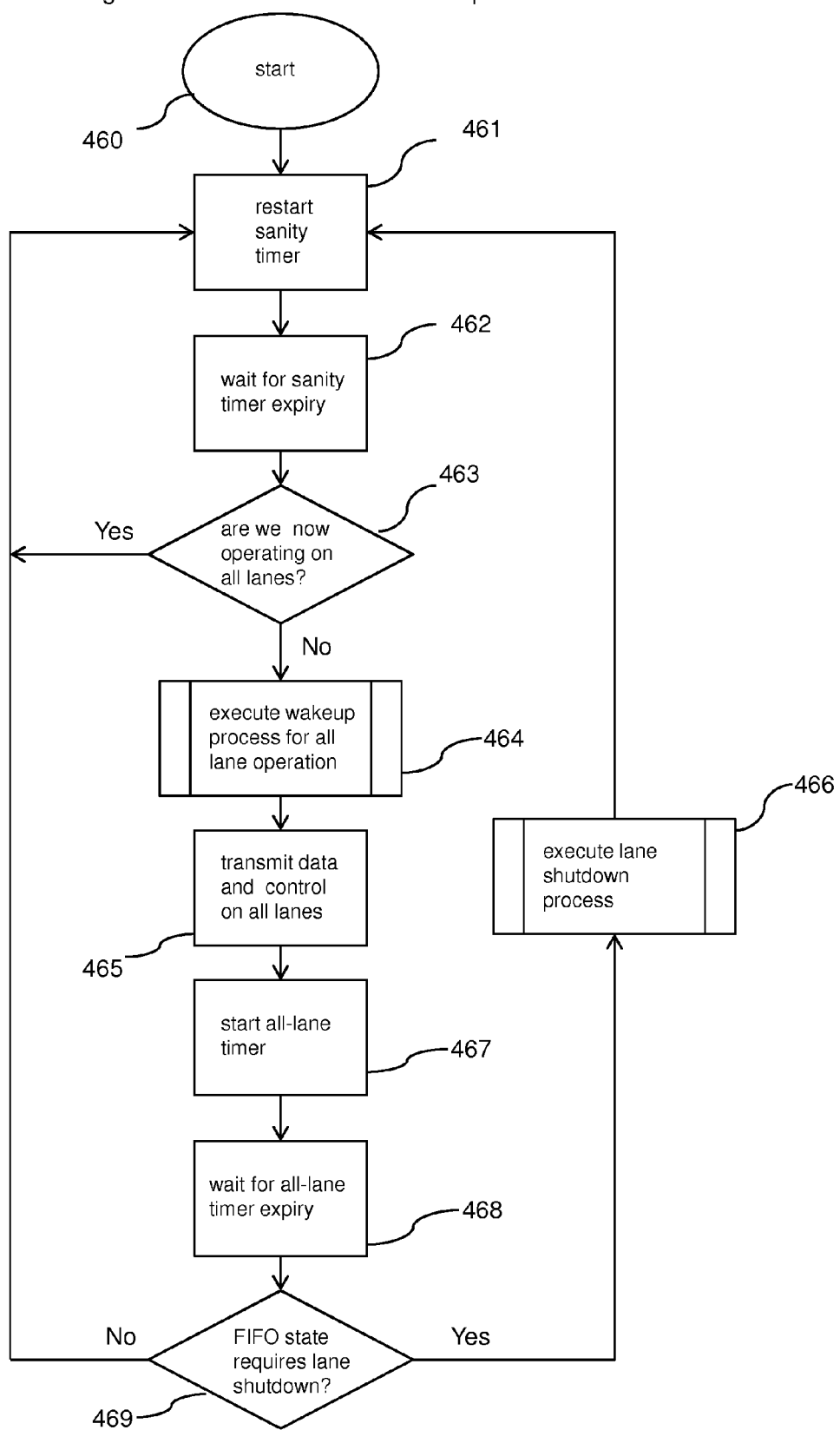
Fig 17. Periodic Transmitter Wakeup

Fig 18. Receiver State Diagram
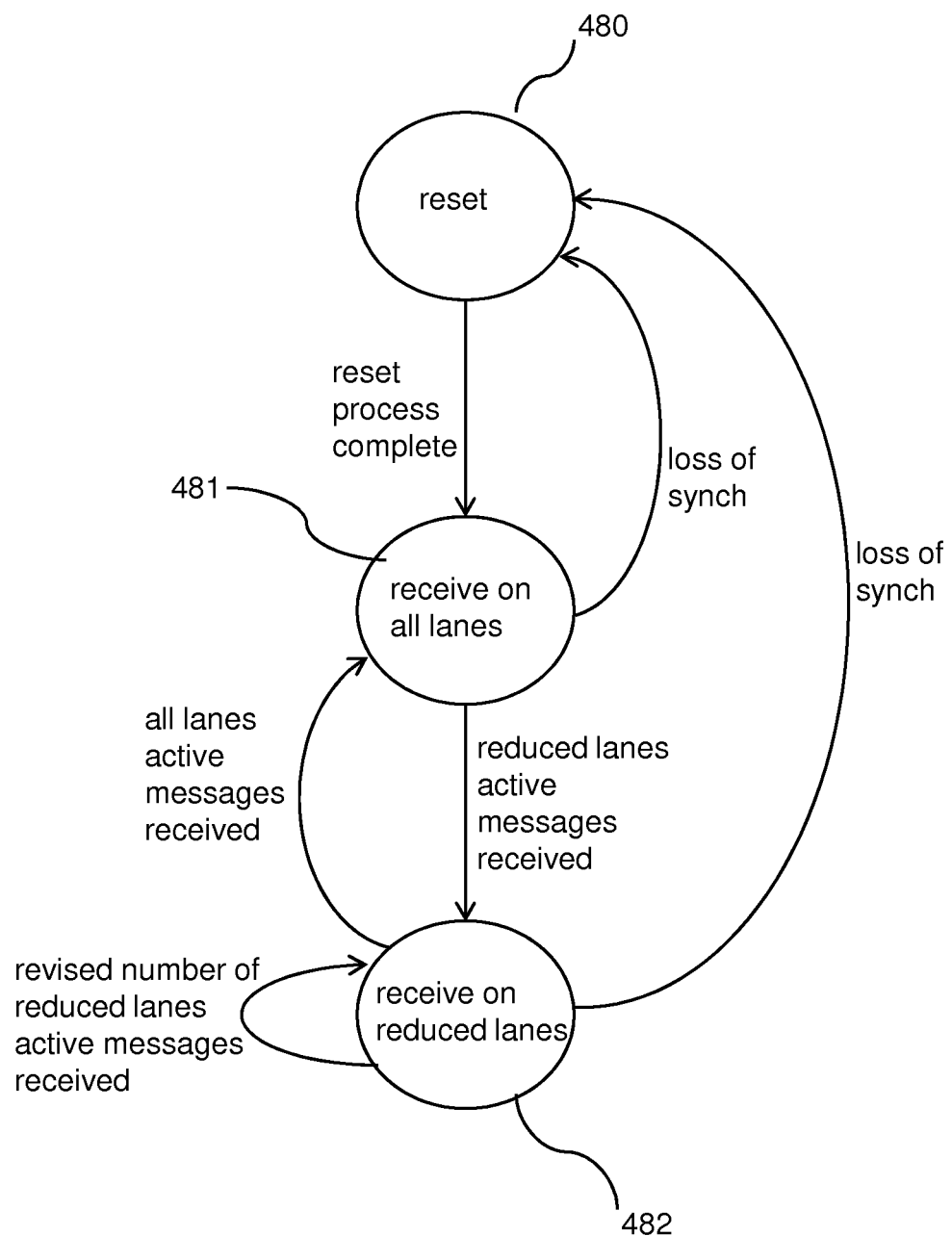

METHOD AND APPARATUS FOR ADAPTIVE POWER CONTROL IN A MULTI-LANE COMMUNICATION CHANNEL

FIELD OF THE INVENTION

This invention relates to communication systems in general, and in particular a power saving method and apparatus for multi-lane communication channels.

BACKGROUND OF THE INVENTION

As communication systems increase in speed and complexity in response to customer demand for increasing volume of data, a number of problems arise, one of which is an increase in electrical power consumption due to the increase in the number of circuits required and their greater switching speed. There is a need therefore to devise innovative means of reducing power consumption while simultaneously maintaining the ability to transmit and receive data at the highest possible rates.

When data is transferred in packetized form, there are many times when the aggregate data actually being transmitted is less than the total capacity of the communication channel. This creates inefficiency since there exists this unused capacity, but furthermore there continues to be electrical power consumed during these idle times.

In some prior art communication systems, power savings have been achieved by adapting the transmit power level according to the channel conditions in order to obtain an acceptable signal to noise ratio. This is commonly done in portable wireless devices where limited battery energy is available. In many such embodiments, the transmitter is shut down during substantially idle periods, and brought up to maximum power only when a fully functional full duplex communication channel is required. In other embodiments, the transmit power level is decreased when the received signal to noise ratio is above a certain threshold and the transmit power level is increased when the received signal to noise ratio is below a certain threshold.

In other prior art communications systems, such as Energy Efficient Ethernet, the physical link is shut down in order to save energy during idle intervals. However, this energy-saving technology is confined to communication channels that employ a single link.

SUMMARY OF THE INVENTION

The present invention exploits the bursty nature of many data communication signals in order to reduce power consumption during times of lower activity.

Thus, according to one aspect the invention an apparatus for sending incoming data to a receiver over a digital communication channel having a multiplicity of lanes, each lane including a transmitter circuit and receiver circuit, the apparatus comprising a transmitter buffer for temporarily storing the incoming data prior to transmission over said digital communication channel and having a fill level indicative of the volume of data to send; transmitter power logic responsive to the fill level of said transmitter buffer to determine the number of lanes required to provide the desired bandwidth for data communication and to place each of said lanes into either an inactive low-power state for power saving operation or an active powered up state for normal operation in accordance with the number of lanes required for data communication; and transmit formatting logic for distributing the incoming data in accordance with a striping algorithm over lanes that are in the active powered up state; and wherein said transmitter power logic is configured to generate control messages for transmission to the receiver to indicate the states of the lanes.

Embodiments of the invention reduce the electrical power consumption of a data communication circuit in response to the amount of data being transferred, with the result that the power consumption is reduced when there is less data being transferred than the total capacity of the channel. In particular, when the communication channel consists of two or more links known as "lanes", individual lanes are powered down when they are not required in order to transmit the total data, which is waiting to be sent in a transmission buffer.

Furthermore, embodiments of the present invention are automatically able to adjust the number of active lanes periodically in response to changes in the amount of data waiting to be transmitted. Embodiments of the invention thus achieve the desired goal of reducing power consumption while at the same time being able to transmit data at the maximum possible rate equal to that achievable with all lanes active at all times.

Embodiments of the present invention are designed for communication channels which employ multiple lanes which operate at a nominal power level at all times, with energy savings achieved by means of limiting the number of active lanes according to the current data throughput requirements.

Embodiments of the present invention addresses the extra complexity required when data is distributed over multiple lanes, such as the need to re-align the data being received on the various lanes at times when the number of lanes transitions from a lower number to a higher number and to perform this function seamlessly without losing data.

In another aspect the invention provides an apparatus for receiving incoming data sent from a transmitter over a digital communication channel having a multiplicity of lanes, each lane including a transmitter circuit and receiver circuit, the apparatus comprising: receiver power logic responsive to control messages received from the transmitter to place the receiver circuits of each of said lanes into either an inactive low-power state for power saving operation or an active powered up state for normal operation; and receive formatting logic for reassembling the incoming data in accordance with a striping algorithm.

In a still further aspect the invention provides a method of power conservation in a multi-lane communication channel, each lane including a transmitter circuit and receiver circuit, comprising receiving incoming data in a transmit buffer having a fill level indicative of the volume of data to send; determining the number of active lanes required to provide the desired bandwidth for data communication based on the fill level of the transmit buffer; placing each of said lanes into either an inactive low-power state for power saving operation or an active powered up state for normal operation based on the number of lanes required for data communication; sending control messages to the receiver to the receiver indicating the states of the lanes; and transmitting the data over the active lanes in accordance with a striping algorithm.

BRIEF DESCRIPTION OF THE DRAWINGS

The invention will now be described in more detail, by way of example only, with reference to the accompanying drawings, in which:

FIG. 1 is a high level block diagram of an apparatus in accordance with one embodiment of the invention;

FIG. 2 is an illustration of the active lanes when the transmit data buffer fill level is greater than "threshold 2";

FIG. 3 is an illustration of the active lanes when the transmit data buffer fill level is greater than or equal to "threshold 1" but less than or equal to "threshold 2";

FIG. 4 is an illustration of the active lanes when the transmit data buffer fill level is less than "threshold 1";

FIG. 5 is a detailed illustration of the transmitter and receiver showing multiplexing and powering signals;

FIG. 6 shows details of the Control Word format;

FIG. 7 shows details of the Shutdown and Wakeup Messages;

FIG. 8 shows details of the Fast Sync Message;

FIG. 9 shows a shutdown signaling sequence showing the sequence of data and control words transmitted to cause a powering down of specific lanes;

FIG. 10 shows a shutdown signaling sequence when the shutdown messages collide with meta frame words;

FIG. 11 shows a Wakeup signaling sequence showing the sequence of data and control words transmitted to cause a powering up of specific lanes FIG. 12 shows a Wakeup signaling sequence when the wakeup messages collide with meta frame words;

FIG. 13 shows details of the Fast Sync offset calculation;

FIGS. 14a and 14b show an algorithm for the process of Fast Sync word alignment;

FIG. 15 shows an algorithm for Scrambler State word processing performed in parallel with the Fast Sync word alignment and lane alignment, performed after all values of countdown value, metaframe pointer, and scrambler state word have been validated;

FIG. 16 shows an algorithm for the update of the number of active lanes in the receiver;

FIG. 17 shows an algorithm for the periodic wakeup of the transmitter on all lanes; and FIG. 18 is a receiver state diagram showing how it may recover from synch errors.

DETAILED DESCRIPTION OF EMBODIMENTS OF THE INVENTION

In the present disclosure, the following definitions apply. "Message" and "word" are intended to convey the same meaning "FIFO" means "First In First Out"

While the description is specific to the Interlaken implementation of a multi-lane communication channel, it is to be noted that the invention may be applied with equal benefit to any one of various other multi-lane technologies such as 40 Gb/s and 100 Gb/s Ethernet. The Interlaken implementation is described in Interlaken Protocol Definition; Revision: 1.2; Oct. 7, 2008; A Joint Specification of Cortina Systems and Cisco Systems, the contents of which are herein incorporated by reference.

Referring to FIG. 1, data to be transmitted 20, which is typically packet data such as Ethernet frames, is transferred to a transmitter buffer 1 containing a known First In First Out (FIFO) memory 2. In order to determine the number of lanes required to transmit the data stored in the FIFO, there are provided a number of thresholds to indicate the "fill" state of the FIFO. In the example shown in FIG. 1, the thresholds are defined as empty 10, full 7, threshold 1 9, which is greater than empty 10 but less than full 7, and threshold 2 8, which is greater than threshold 1 9 but less than full 7. In some embodiments there are additional threshold values provided. In some embodiments the values of the thresholds are varied from time to time according to the desired behavior of the energy saving algorithm.

Data contained in the transmitter buffer 1 is transferred to the transmitter 3 by means of a bus 11 consisting of k parallel lines, where k is at least 1.

Transmitter 3 contains a known multiplexing circuit which performs the function of distributing the data 11 across a number of lanes n 4 to 5 in a predetermined sequence, said sequence having been determined from a calculation which uses transmit FIFO fill level 110 as an input. Transmitter 3 also functions to convert the data into an electrical or optical signal appropriate for the medium being used for the n lanes 4 to 5. Each lane may be an electrical or optical communication link.

After traversing the n lanes 4 to 5, data is collected by a receiver 6, which performs several functions; firstly to convert the received signal from an optical or electrical form to a logic level which can be used for additional circuits within receiver 6, and secondly to reorder the data from the predetermined sequence of the transmitter into the correct sequence for transmission to further logic at its output 21 which consists of m parallel lines where m is at least 1. Whereas the predetermined sequence at the inputs 4 to 5 of the receiver 6 varies according to the desired capacity based on FIFO fill level 110, the sequence at the output 21 of the receiver 6 is required to be consistent at all times. Therefore the logic downstream from receiver 6 need not be aware of the energy saving functions, which have been performed at the transmitter and receiver.

Table 30 lists example fill levels and the resulting number of lanes that will be active in a typical embodiment of the present invention.

While FIG. 1 illustrates a transmitter and receiver transferring data in one direction, it is to be understood that in some embodiments an additional transmitter and receiver will exist to transfer data in the opposite direction in a configuration known as full duplex. It is noted that the two directions function independently and accordingly the functions of the present invention are preferably implemented independently such that the number of active lanes in each direction are not required to be the same.

FIG. 2 illustrates the configuration of active lanes when the amount of data in transmit FIFO 2 is greater than a level indicated by "threshold 2" 8. In the event of this occurring, the number of active lanes is equal to "n", which in this example is all the lanes. This is indicated in the table 30 and the active lanes are as shown 40.

FIG. 3 illustrates the configuration of active lanes when the amount of data in transmit FIFO 2 is less than or equal to a level indicated by "threshold 2" 8 and greater than or equal to a level indicated by "threshold 1" 9. In the event of this occurring, the number of active lanes is equal to "n/2" lanes in this example. This is indicated in the table 30, the active lanes are as shown 40 and the inactive lanes are as shown 41.

FIG. 4 illustrates the configuration of active lanes when the amount of data in transmit FIFO 2 is less than a level indicated by "threshold 1" 9, including the case when the transmit FIFO 2 is "empty" 10. In the event of this occurring, the number of active lanes is equal to 1 in this example. This is indicated in the table 30, the active lane is as shown 40 and the inactive lanes are as shown 41.

Referring to FIG. 5, the functions of the transmitter and receiver will now be described in detail. Packetized data from the transmit buffer FIFO is present on bus 11, consisting of k parallel lines where k is at least 1. In some embodiments, bus 11 is known as "LBUS". Data is processed by known transmit formatting logic 54, which in the preferred embodiment implements the Interlaken protocol. The output of formatting logic 54 consists of j×n parallel lines, where j is the width of each tx SerDes 56 (serializer/deserializer) and n is the number of lanes. Digital data is presented to each SerDes according to a predefined sequence using a striping algorithm specified by the Interlaken protocol. The output of each SerDes is input to a transmitter circuit 57, which converts the digital output from each SerDes into an electrical or optical signal, which can be carried on the medium, which carries each lane. FIG. 5 illustrates by way of example a number of lanes from "Lane 1" 4 to "Lane n" 5, each connected to a corresponding SerDes and tx circuit. The signal of "Lane 1" 4 is received by rx receiver circuit 63. Similarly, each lane in turn is received by an individual receiver circuit up to and including "Lane n" 5. Receiver circuit 63 converts the signal present on the medium comprising "Lane 1" 4 into a digital logic signal, which is then input to rx SerDes 1 64. Similarly, each receiver circuit has an output which goes to a corresponding individual SerDes circuit, up to and including rx SerDes n 70. The output of each SerDes consists of j parallel lines, which all together comprise a bus 65 containing j×n parallel lines, where n is the number of lanes. Bus 65 is the input to known receive formatting logic 66, which in the preferred embodiment implements the Interlaken protocol. After processing by receive formatting logic 66, received data is made available to downstream logic on bus 21 consisting of m parallel lines where m is at least 1. In some embodiments, bus 21 is known as "LBUS".

Referring again to FIG. 5, the functions of the logic which control the power consumption state of the circuits comprising each lane will now be described in detail.

Each SerDes, tx transmit circuit, and rx receive circuit has the ability to be placed into a state of lower power consumption using known techniques by those skilled in the art, such as disabling the clock signal or switching off the power voltage to the circuit. Embodiments of the invention generate a control signal for each circuit such that said circuits may be placed into a particular state of power consumption.

FIFO buffer fill level 110, as described in FIG. 1, is presented to transmitter power logic 52 for the purpose of determining the power consumption state of the circuits comprising each lane. Transmitter power logic circuit 52 therefore determines the desired activity state of each lane as previously defined and described in FIG. 1 and listed in the table 30 and shown by example in FIG. 2 through FIG. 4. In addition, transmitter power logic 52 performs the function of sending signals 59 to each tx SerDes and tx transmitter circuit that indicate the power consumption state to be used by the particular circuit. In addition, transmit power logic 52 determines the new striping algorithm to be implemented by transmit formatting logic 54, which is dependent on the configuration of active lanes at any particular time. In addition, transmit power logic 52 generates messages which will be inserted by the transmit formatting logic 54 into its output bus 55 and which will be received by receive formatting logic 66 for the purpose of signaling the desired activity status of the circuits within the receiver 6. Receive formatting logic 66 therefore extracts power messages 62, which function to signal the activity status of each rx SerDes and rx receiver within the receiver 6. Power messages 62 are processed by receiver power logic 53, which in turn generates power up/down signals 60 to affect the power control function for each rx SerDes and rx receiver. Therefore, FIFO buffer fill level 110 has been used to control the activity and power consumption state of all tx SerDes, rx SerDes, tx transmitter, and rx receiver circuits as a function of the required bandwidth, which is determined by the number of lanes active. Finally, receiver power logic 53 determines the required striping algorithm corresponding to the number and configuration of active lanes, and presents the results to receive formatting logic 66 so that it can correctly decode the digital signals on bus 65. In some embodiments, receiver power logic 53 is included in receive formatting logic 66 and transmit power logic 52 is included in transmit formatting logic 54.

The messages that are sent to signal the number of active lanes will now be described in detail.

FIG. 6 illustrates the message format 210 to be used in sending control information using the known Interlaken protocol. Each control word 210 comprising an Interlaken message consists of 67 bits defined as follows. Bit 66 determines whether the remaining bits 65 through 0 are inverted or not depending on the running disparity, where a value of 1 indicates that the remaining bits are inverted and a 0 indicates that the remaining bits are not inverted. Bits 65 through 63 indicate the type of word being transmitted, which in the case of the new messages defined for the present invention are the following values: bit 65=1; bit 64=0; bit 63=0. Bits 62 through 58 indicate the Block Type, which are assigned the values to be defined as follows. Bits 57 through 0 contain Block Specific Information, which are assigned the values to be defined as follows.

FIG. 7 illustrates the assigned bit values for the Shutdown 220 and Wakeup 221 messages. Bit 66 is assigned a value of 1 if the remaining bits are inverted and a value of 0 if the remaining bits are not inverted. The Control Word Indicator bits are assigned the following values: bit 65=1; bit 64=0; bit 63=0. A specific Shutdown message 220 is characterized by the following additional bit assignments: bit 62=0; bit 61=0; bit 60=0; bit 59=0; bit 58=0; bits 57 through 53 indicate the number of message blocks remaining before data blocks will be transmitted, where an assignment of all 0 corresponds to 0 message blocks and an assignment of all 1 indicates 31 message blocks; each of bits 52 through 42 are assigned a value of 0; bits 41 through 34 indicate the new number of lanes which will be active, where bit 41 is the most significant bit of an 8-bit binary number corresponding to the new number of lanes which will be active, with valid values ranging from 1 up to and including the total number of lanes comprising the communication channel; and each of bits 33 through 0 are assigned a value of 0. A specific Wakeup message 221 is characterized by the following additional bit assignments: bit 62=0; bit 61=1; bit 60=1; bit 59=0; bit 58=0; bits 57 through 53 indicate the number of message blocks remaining before data blocks will be transmitted, where an assignment of all 0 corresponds to 0 message blocks and an assignment of all 1 indicates 31 message blocks; each of bits 52 through 42 are assigned a value of 0; bits 41 through 34 indicate the new number of lanes which will be active, where bit 41 is the most significant bit of an 8-bit binary number corresponding to the new number of lanes which will be active, with valid values ranging from 1 up to and including the total number of lanes comprising the communication channel; and each of bits 33 through 0 are assigned a value of 0. Shutdown 220 and Wakeup 221 messages are scrambled according to the known Interlaken protocol in order to provide clock transitions for the corresponding rx SerDes circuit.

FIG. 8 illustrates the assigned bit values for the Fast Sync message 230. Bit 66 is assigned a value of 1 if the remaining bits are inverted and a value of 0 if the remaining bits are not inverted. The Control Word Indicator bits are assigned the following values: bit 65=1; bit 64=0; bit 63=0. A specific Fast Sync message is characterized by the following additional bit assignments: bit 62=1; bit 61=0; bit 60=0; bit 59=1; bit 58=0; bits 57 through 53 indicate the number of message blocks remaining before data blocks will be transmitted, where an assignment of all 0 corresponds to 0 message blocks and an assignment of all 1 indicates 31 message blocks; bits 52 through 15 comprise a "sync field" with the hexadecimal values of 1AF8BD83C7; bits 14 through 0 comprise a "meta frame pointer" which functions to signal the next metaframe in order to align lanes. Bits 14 through 0 are encoded using known "4B/5B" encoding as shown in the table 231 in order to provide clock transitions for the proper functioning of the corresponding rx SerDes circuit. The Fast Sync message 230 is not scrambled. Each Fast Sync message 230 is followed by a "scrambler state word" according to the known Interlaken protocol specification.

FIG. 9 illustrates the sequence of data and control messages that are sent to signal a shutting down of specific lanes. In this example, there are five (5) lanes implemented, which are "Lane 1" 321, also known as the "Master Lane", "Lane 2" 322, "Lane 3" 323, "Lane 4" 324, and "Lane 5" 325. Prior to the shutting down of any lanes, data and control words are present on all lanes with a sequence according to the known Interlaken protocol, where during a certain time period there are data words 301 transmitted on all lanes, followed periodically by known Diagnostic words 302, Sync words 303, Scrambler State words 304, and Skip words 305 which all together are known as Meta Frame words. At a time of reference 306 data and control words are being transmitted on all lanes with a pre-defined striping sequence calculated for five (5) lanes. Additional data 307 is transmitted also according to said predefined striping sequence. Consider now that during the time interval 307, and with reference to FIG. 1 and FIG. 5, the previously described transmit FIFO buffer fill level 110 attains a value of between "threshold 1" 9 and "threshold 2" 8. This causes transmit power logic 52 to generate a message to signal a new number of active lanes equal to n/2. Since n/2 is a fractional number, it is rounded up to a value of three (3), which is the new number of active lanes. Referring again to FIG. 9, a sequence of Shutdown words 308 are transmitted on all lanes, which signal the instruction to cause the following actions: 1) transmit data on "Lane 1" 321, "Lane 2" 322, and "Lane 3" 323 but not on "Lane 4" 324 and "Lane 5" 325 immediately following the last Shutdown word, employing a predefined striping algorithm specific to the use of three (3) lanes and 2) remove power from the unused circuits comprising "Lane 4" 324 and "Lane 5" 325 immediately following the last Shutdown word. The instructions encoded in the Shutdown message word are received by receive power logic 53 of FIG. 5 which implements the function of calculating the new striping algorithm and generating the signals which control the activity of rx receiver circuits 63 and rx SerDes circuits 64 of FIG. 5. Now at a time of reference 309, data will be present only on the three (3) active lanes according to the new striping algorithm. At times going forward, as long as the buffer fill level 110 remains between "threshold 1" 9 and "threshold 2" 8, there will be sequences of data words 310, Meta Frame words 311, and more data words 312 transmitted on three (3) lanes according to the Interlaken protocol. If at any time the transmit FIFO buffer fill level 110 attains a value which is not between "threshold 1" 9 and "threshold 2" 8, the transmit power logic 52 will function to generate the necessary messages to signal the required number of active lanes. The number of active lanes is always calculated sequentially beginning with "Lane 1" 321, also known as the Master Lane. The Master Lane is active at all times regardless of the FIFO buffer fill level 110. In some embodiments, different combinations of active and inactive lanes are defined and permitted.

FIG. 10 illustrates the sequence of data and control messages that signal a shutting down of specific lanes in the event that Shutdown words are required to be sent during a time interval assigned to the sending of other control messages. The shutdown sequence is identical to that illustrated in FIG. 9 with the following exception. A series of Shutdown words 334 is transmitted and before all have been sent, the instant of time required for the transmission of Interlaken Meta Frame words occurs. Then the required Meta Frame words 335 are sent, followed immediately by the remainder of the Shutdown words 336. As similarly illustrated in FIG. 9, at a time of reference 337, data will be present only on the three (3) active lanes according to the new striping algorithm. At times going forward, as long as the buffer fill level 110 remains between "threshold 1" 9 and "threshold 2" 8, there will be sequences of data words 338 and other words transmitted on three (3) lanes according to the Interlaken protocol.

FIG. 11 illustrates the sequence of data and control messages that are sent to signal the waking up of specific lanes. Consider first an instant in time 352 when there are three (3) lanes active out of a total of five (5) available as a consequence of transmit FIFO buffer level 110 in FIG. 1 having a value between "threshold 1" 9 and "threshold 2" 8. As shown in FIG. 11, the corresponding active lanes are "Lane 1" 321, "Lane 2" 322, and "Lane 3" 323 and the inactive lanes are "Lane 4" 324 and "Lane 5" 325. In this state, the active lanes will contain data 350 and data 353 as well as periodic Meta Frame words 351 transmitted with a striping algorithm according to the known Interlaken protocol. It may happen that transmit FIFO buffer fill level 110 will at some time exceed "threshold 2" 8 and at such time the transmit power logic 52 of FIG. 5 will function to signal a new number of active lanes which in this example is five (5). Consequently, a sequence of Wakeup message words 354 is sent to signal the corresponding receive power logic 53 of FIG. 5 to calculate the new striping algorithm for five (5) active lanes as well as the new power state for each rx SerDes 64 and rx Receiver 63 of FIG. 5. Following transmission of the last Wakeup message, some data words 359 may continue to be transmitted on the three (3) active lanes until the time 355 that the new number of active lanes arrives. At times going forward, as long as transmit FIFO buffer fill level 110 remains above "threshold 2" 8 of FIG. 1, there will be sequences of data words 356 and 358 and Meta Frame words 357 transmitted on five (5) lanes according to the Interlaken protocol. If at any time transmit FIFO buffer fill level 110 attains a value below "threshold 2" 8, the transmit power logic 52 will function to generate the necessary messages to signal the required number of active lanes. To ensure a timely synchronization among the five (5) active lanes at the time 355 of full activity, a series of Fast Sync words 360 and Scrambler State words 361 is transmitted on the two (2) inactive lanes prior to full activity time 355. These function as follows. As shown in FIG. 8, each Fast Sync message word contains a meta frame pointer 232, which functions to signal the time of offset between a particular Fast Sync word relative to a standard Interlaken Sync word 362. Accordingly, the receive power logic 53 of FIG. 5 is able to signal the receive formatting logic 66 with the timing information necessary to align all five (5) lanes in advance of the time 355 when receive formatting logic 66 is required to implement the new striping algorithm for the reception of valid data 356. To further aid in the decoding of data at receive formatting logic 66, each Frame Sync word 360 is followed by a Scrambler State word 361 which functions to inform the descrambling logic within receive formatting logic 66 of the scrambler state in order to reduce the time needed to search for said scrambler state. The number of Frame Sync words to be transmitted is able to be calculated by persons skilled in the art and is dependent on the time required to achieve proper functioning of the tx transmitter circuits, rx receiver circuits, tx SerDes circuits and rx SerDes circuits after full power has been applied to them.

FIG. 12 illustrates the sequence of data and control messages that signal the waking up of specific lanes in the event that Wakeup words are required to be sent during a time interval assigned to the sending of Meta Frame words. The wakeup sequence is identical to that illustrated in FIG. 11 with the following modified behavior. At a given time 370, three (3) lanes are active to transmit data 371 as a result of the state of transmit FIFO buffer fill level 110. It may happen that transmit FIFO buffer fill level 110 will at some time exceed "threshold 2" 8 and at such time the transmit power logic 52 of FIG. 5 will function to signal a new number of active lanes which in this example is five (5). As before in FIG. 11, a sequence of Wakeup words 372 is transmitted on the active lanes. In this event however the time that Meta Frame words 373 are required to be transmitted coincides with the time interval for the transmission of Wakeup words. Consequently, if any additional Wakeup words 374 are required to be transmitted, this action is performed following the transmission of Meta Frame words 373. Fast Sync messages 380 and Scrambler State messages 381 on the newly active lanes are not interrupted by Meta Frame words. As previously illustrated in FIG. 11, some data 375 may continue to be transmitted on the three (3) active lanes until a time 376 when data transmission 377 commences on all five (5) lanes 321, 322, 323, 324, and 325.

FIG. 13 illustrates the values encoded within the Fast Sync message 360 of FIG. 11. In FIG. 13, Fast Sync message 390 includes an encoded value called "MFP" 392, also known as Meta Frame Pointer, of "0C" in hexadecimal representation, which is equal to a value of 12 in the decimal number system. Therefore the next Sync word 391 will occur in 12 words following the present Fast Sync word 390 and this provides the information required to align all future active lanes prior to the transmission of data on the presently inactive lanes.

In this manner the number of active lanes comprising a multi-lane communication channel can be varied and the transition to a new number of active lanes can be performed in a timely manner without the loss of any data.

FIG. 14a and FIG. 14b illustrate an algorithm for checking the integrity of the Fast Sync word information. The algorithm start 400 occurs when the Clock Data Recovery (CDR) circuit has achieved a lock condition using known technology. At this time a timeout counter is started 500. Immediately a first and second fast sync word are read 401. The fast sync words are then checked for sync field 402 and countdown field and metaframe field 411. Referring now to FIG. 14a, following the check of the sync field of each sync word, a comparison is made for a match 403. If the sync fields match "yes", a flag is set 409 to indicate success in matching two consecutive sync fields. This part of the algorithm then stops 405. In the event that the sync fields do not match "no", the next sync word 404 will be used for comparison. A check is made 406 for a timeout condition. If the increment to the next word was successful and the timeout was "no", the algorithm loops back to a comparison 402 of said next sync word with the last sync word of the previous pair of sync words. In the event that the timeout expiry is "yes", there is a failure of fast sync and the algorithm proceeds to the known lane sync process 407, which uses Interlaken metaframes. Upon the completion of the known lane sync process, normal data transfer proceeds on the new active lanes 408. Referring now to FIG. 14b, a check is made 411 of the countdown fields and metaframe fields of the two consecutive fast sync words. The values are compared to determine if they are as expected 412. An expected value is one where the countdown field and metaframe field is properly decremented from one fast sync word to the next. If "yes", then the next check is made 413 which is to determine if the sync fields have matched according to the test made in another part of the algorithm at 403 and 409. The sync fields must match on the current pair of sync words or a previous pair of sync words, and if "yes", then the countdown field and metaframe field is stored for subsequent calculation 414. In the event that the test 412 for countdown and metaframe field fails to "no", an advance is made to the next fast sync word 416. Similarly, in the event that the sync fields have not matched 413 in the present or previous pair of sync words, then again an advance is made 416 to the next fast sync word. If said advance is made, a test is done 417 to determine if the timeout has expired, and if "no" then the algorithm returns to a check 411 of the countdown and metaframe fields in the pair of sync words consisting of the last of the previous pair of sync words and said next fast sync word. Otherwise, in the event that the timeout has expired "yes", the algorithm proceeds to the known lane sync process 418 which uses Interlaken metaframes. Upon completion of the known lane sync process 418, the apparatus proceeds to normal data transfer on the active lanes at 419. In some embodiments the number of fast sync word fields required to be matched is less than two or greater than two or programmable.

FIG. 15 illustrates an algorithm for checking the integrity of Scrambler State words and proceeding to lane sync when successful. This algorithm is performed in parallel with the algorithm depicted in FIG. 14a and FIG. 14b. Start 420 occurs when the timeout counter has started. Immediately a first and second scrambler state word are read 421. The scrambler state words are then checked 422 for the scrambler state fields and a decision 424 is made depending on their match. If the field match is "yes", the algorithm then checks if the countdown and metaframe values have been locked in 430. If "yes" then the valid metaframe offset value and scrambler state valued are used to perform lane alignment 426. After the new active lanes have been aligned, the apparatus can perform normal data transfer on the newly active lanes 428. In the event that the match test 424 for scrambler state values results in a "no" the algorithm advances to the next scrambler state word 425. In this event, a test is made 423 to determine if the timeout has expired. If "no", then the algorithm returns to check a new pair of words 422 consisting of the last of the previous pair of scrambler state words plus the new one. If "yes", the algorithm proceeds to the known lane sync process 427, which uses Interlaken metaframes. Upon completion of the known lane sync process 427 the apparatus proceeds to normal data transfer on the active lanes at 428. In the event that the test 430 for metaframe offset and countdown results in a "no", the algorithm waits for those values to be locked in 431. In the event that the waiting process succeeds with said values being locked in, the algorithm proceeds to using said locked in values 426. In the event that the waiting process fails, the algorithm proceeds to the known lane sync process 427, which uses Interlaken metaframes. In some embodiments the number of scrambler state fields required to be matched is less than two or greater than two or programmable.

FIG. 16 illustrates an algorithm which is followed at the receiver and which causes the number of active lanes to be updated. Upon initial startup 440, the receiver will operate on all possible active lanes 441. Subsequent to operation on all lanes, the receiver will wait for shutdown and wakeup messages 442. When a messages has been received, it will be counted. Said count is tested for a value 444 and when the value equals two (2) the number active lanes will be updated to the new value as defined in the received messages 445. In some embodiments it is required that the number of received messages equals at least one (1). In some embodiments it is required that the number of received messages equals at least two (2). Subsequent to the process of updating the number of active lanes, the algorithm continues to monitor for additional wakeup and shutdown messages. If the test for said count of messages is equal to less than two (2), the receiver continues to operate on the present number of lanes 443 and proceeds to waiting for shutdown and wakeup messages 442. If at any time during operation the receiver is unable to achieve synchronization with the received messages, the algorithm will return to the start 440 due to a reset condition.

FIG. 17 illustrates an algorithm that occurs at the transmitter whose function is to operate periodically on all lanes. The purpose of this algorithm is to re-synchronize with the receiver in the event that the receiver has been reset and is operating in its default condition of receiving on all lanes. Prior to start 460, the transmitter is operating on the number of lanes previously calculated. Subsequent to start 460, the algorithm begins a "sanity" timer 461. Next said "sanity" timer counts down 462. Upon timer expiry, a decision is made 463 depending on the present number of active lanes. If the present mode of operation is all lanes, the "sanity" timer is restarted 461. If the present mode of operation is less than all lanes, the transmitter executes the wakeup process for operation on all lanes 464. Next the transmitter operates on all lanes 465. Next the algorithm starts the "all-lane" timer 467. Next said "all-lane" timer counts down 468. Upon expiry of said "all-lane" timer, the algorithm tests for the transmit FIFO buffer fill level 469. If the outcome of the test requires adjustment to the number of active lanes, the lane shutdown process is executed 466, and upon completion of the shutdown process the sanity timer is restarted 461. If the outcome of said test does not require a shutdown of any lanes, operation continues on all lanes and the sanity time is restarted 461. The value of each timer may be calculated by those skilled in the art and is dependent on the desired performance of the communication channel.

FIG. 18 illustrates the receiver state diagram. Subsequent to the reset state 480, the receiver proceeds to the state of operation on all lanes 481. If messages are received to operate on a reduced number of lanes, the receiver proceeds to the state of operation on a reduced number of lanes 482. If while in the state of operating with a reduced number of lanes messages are received to change the number of active lanes, the receiver may proceed to the state of all lanes active 481 or else if not all lanes, the number of active lanes is revised and the receiver remains in the state of operation with a reduced number of lanes 482. If there is a loss of synchronization while operating in any state, the receiver will proceed to the reset state 480.

While the embodiment described above employs in-band signaling messages to control the power state of a particular receiver circuit, alternative embodiments may employ an out-of-band signaling channel to send messages that accomplish the same function. An out-of-band signaling method also provides the capability of powering down all lanes in the event that the transmit buffer has no data to send, in which event the out-of-band signaling method may be used to send messages or signals to power up the required number of lanes at a time when the transmit buffer exceeds a certain pre-defined threshold.

In some embodiments, the lane shutdown and wakeup criteria may be determined from the availability of electrical energy at a given time.

In some embodiments, the lane shutdown and wakeup criteria may be determined on the basis of environmental factors such as the temperature within a system.

In some embodiments, the lane shutdown and wakeup criteria may be determined on the basis of faults on specific lanes such as excess error rate.

In some embodiments, the power logic of FIG. 5 is included in the formatting logic of FIG. 5.

Persons skilled in the art may devise protocols which vary in detail from the Interlaken protocol but which also make use of the present invention by performing the appropriate adjustments to the detailed messages which signal the power saving and wakeup instructions such as employing a different number of bits or assigning functions to a different sequence of bits in each word.

Persons skilled in the art may conceive of various embodiments which are additional to those described above, which are meant to illustrate. Accordingly, any embodiment that falls within the scope of the claims set forth below is to be regarded as part of the invention described herein.

We claim:

1. An apparatus for sending incoming data to a receiver over a digital communication channel having a multiplicity of lanes, each lane including a transmitter circuit and receiver circuit, the apparatus comprising:

a transmitter buffer for temporarily storing the incoming data prior to transmission over said digital communication channel and having a fill level indicative of a volume of data to send;

transmitter power logic responsive to the fill level of said transmitter buffer to determine a number of lanes required to provide a desired bandwidth for data communication and to place each lane of the multiplicity of lanes into either an inactive low-power state for power saving operation or an active powered up state for normal operation in accordance with the number of lanes; and transmit formatting logic for distributing the incoming data in accordance with a striping algorithm over lanes that are in the active powered up state;

wherein the transmit formatting logic is configured to distribute the incoming data in meta frames over the lanes that are in the active powered up state, each meta frame including a diagnostic word, a portion of the incoming data, skip word, a scrambler state word, and a synchronization word; and wherein said transmitter power logic is configured to:

generate control messages for transmission to the receiver to indicate the inactive low-power or active powered up states of the lanes of the multiplicity of lanes;

send a shut down message to the receiver to reduce the number of lanes in the active powered up state in the event of the fill level falling below a particular threshold, and a wakeup message to the receiver to increase the number of lanes in the active powered up state in the event of the fill level rising above the particular threshold; and transmit synchronization messages over inactive lanes prior to their restoration to full activity status;

wherein each synchronization message includes a field indicating an offset between the field and the synchronization word in a subsequent meta frame to be transmitted.

2. The apparatus of claim 1, wherein said transmitter power logic is configured to determine the striping algorithm to be applied by said transmit formatting logic based on the inactive low-power or active powered up states of said multiplicity of lanes.

3. The apparatus of claim 1, wherein said transmitter power logic is configured to pass the control messages to said transmit formatting logic for inclusion in the data to send over the digital communication channel to the receiver.

4. The apparatus of claim 1, wherein said transmitter power logic is configured to send signals to the transmitter circuits of each of the multiplicity of lanes to place said transmitter circuits in an inactive low-powered state or an active powered up state.

5. The apparatus of claim 1, wherein a serializer/deserializer is coupled between the transmit formatting logic and the transmitter circuit of each of said multiplicity of lanes, and the serializer/deserializer is placed in an inactive low-powered state or an active powered up state with the transmitter circuit of the lane.

6. The apparatus of claim 1, wherein the transmitter buffer has a number of different threshold fill levels, and the transmitter power logic is responsive to the different threshold fill levels to determine the number of lanes required to provide the desired bandwidth for data communication.

7. The apparatus of claim 6, wherein the wakeup messages are striped across all active lanes.

8. The apparatus of claim 6, wherein the wakeup and shutdown messages include a field indicating a new number of lanes to be made active.

9. The apparatus of claim 6, wherein the transmitter buffer is a First In First Out (FIFO) memory circuit.

10. The apparatus of claim 1, wherein the transmitter power logic is configured to send the control messages over an out-of-band channel.

11. The apparatus of claim 1, wherein at least part of the apparatus in implemented by means of an Application Specific Integrated Circuit (ASIC).

12. The apparatus of claim 1, wherein at least part of the apparatus in implemented by means of a Field Programmable Gate Array (FPGA).

13. An apparatus for receiving incoming data sent from a transmitter over a digital communication channel having a multiplicity of lanes, each lane including a transmitter circuit and receiver circuit, the apparatus comprising:
receiver power logic responsive to control messages received from the transmitter to place the receiver circuits of each of said lanes into either an inactive low-power state for power saving operation or an active powered up state for normal operation; and
receive formatting logic for reassembling the incoming data in accordance with a striping algorithm;
wherein the incoming data is received in meta frames over the lanes that are in the active powered up state, each meta frame including a diagnostic word, a portion of the incoming data, skip word, a scrambler state word, and a synchronization word;
wherein the receiver power logic is responsive to synchronization messages received from the transmitter to temporally align the lanes;
wherein the synchronization messages are received over inactive lanes prior to the restoration of the inactive lanes to full activity status; and
wherein each synchronization message includes a field indicating an offset between the field and the synchronization word in a subsequent meta frame to be transmitted.

14. The apparatus of claim 13, wherein the receiver power logic is configured to set the striping algorithm to be applied by said receive formatting logic based on the content of the control messages received from the transmitter.

15. The apparatus of claim 13, wherein the receiver power logic is configured to send striping signals to the receiver circuits to set the striping algorithm.

16. The apparatus of claim 13, wherein the control messages are received over the communication channel from the transmitter.

17. The apparatus of claim 13, wherein the control messages are received over an out-of-band channel.

18. The apparatus of claim 13, wherein the control messages include wakeup messages to place the receiver circuits in the active powered up state, and the wakeup messages are striped across the active lanes.

19. A method of power conservation in a multi-lane communication channel, each lane including a transmitter circuit and receiver circuit, comprising:
receiving incoming data in a transmit buffer having a fill level indicative of a volume of data to send;
determining a number of lanes of the multi-lane communication channel required to provide a desired bandwidth for data communication based on the fill level of the transmit buffer;
placing each lane of the multi-lane communication channel into either an inactive low-power state for power saving operation or an active powered up state for normal operation based on the number of lanes;
sending control messages to the receiver indicating the states of the lanes of the multi-lane communication channel; and
transmitting the data over lanes that are in the active powered up state in accordance with a striping algorithm;
wherein the transmitting includes transmitting the data in meta frames, each meta frame including a diagnostic word, a portion of the incoming data, skip word, a scrambler state word, and a synchronization word;
wherein the control messages include synchronization messages that are sent over the communication channel prior to changing the number of active lanes;
wherein the synchronization messages are sent over inactive lanes prior to restoration to full activity status for fast wakeup; and
wherein each synchronization message includes a field indicating an offset between the field and the synchronization word in a subsequent meta frame to be transmitted.

20. The method of claim 19, wherein the striping algorithm is varied according to a number of the lanes in the active powered up state.

21. The method of claim 19, wherein the control messages generate signals at the receiver to power down the receiver circuits of the lanes in the inactive low-power state.

22. The method of claim 19, wherein the fill level of the transmit buffer is compared with at least one threshold, and the number of lanes placed in the inactive low-power state is based on said comparison.

23. The method of claim 22, comprising a number of different thresholds, wherein different numbers of said lanes are placed in the inactive low-power state depending on the particular threshold reached.

24. The method of claim 19, wherein an error condition occurring during a fast wakeup based on said synchronization messages and alignment causes the apparatus to perform an alignment on all lanes using an alternative slow process.

25. The method of claim 19, wherein the synchronization messages include timing information consisting of a time offset relative to a known time reference.

26. The method of claim 25, wherein during normal operation meta frames are sent over lanes of the multi-lane communication channel for synchronization purposes, and the known time reference is the next meta frame.

27. The method of claim 19, wherein the control messages are transmitted at least two times and the received control messages must be received correctly at least two consecutive times for a change in lane configuration to take place.

28. The method of claim 27, wherein the control messages are striped across all currently active lanes.

29. The method of claim 19, wherein the data is subject to scrambling and scrambling is not performed on newly active lanes during the activation and time synchronization.

30. The method of claim 19, wherein a reset signal is generated in response to an error condition and subsequent operation occurs in a known default state.

31. The method of claim 19, wherein the control messages are transmitted in band over the communication channel.

32. The method of claim 19, wherein the control messages are transmitted on an out-of-band signaling channel.

* * * * *